(12) United States Patent
Clowes et al.

(10) Patent No.: US 11,203,958 B2
(45) Date of Patent: Dec. 21, 2021

(54) GASOLINE PARTICULATE FILTER

(71) Applicant: JOHNSON MATTHEY PUBLIC LIMITED COMPANY, London (GB)

(72) Inventors: Lucy Clowes, Royston (GB); Oliver Destecroix, Royston (GB); John Benjamin Goodwin, Royston (GB); Michael Anthony Howard, Wayne, PA (US); Fezile Lakadamyali, Royston (GB); Sarah Frances Lockett, London (GB); Paul Millington, Reading (GB); Chris Robson, Royston (GB)

(73) Assignee: Johnson Matthey Public Limited Company, London (GB)

( * ) Notice: Subject to any disclaimer, the term of this patent is extended or adjusted under 35 U.S.C. 154(b) by 592 days.

(21) Appl. No.: 15/763,190

(22) PCT Filed: Sep. 30, 2016

(86) PCT No.: PCT/IB2016/055887
§ 371 (c)(1),
(2) Date: Mar. 26, 2018

(87) PCT Pub. No.: WO2017/056067
PCT Pub. Date: Apr. 6, 2017

(65) Prior Publication Data
US 2018/0298800 A1    Oct. 18, 2018

(30) Foreign Application Priority Data

Sep. 30, 2015  (GB) ...................................... 1517327
Mar. 23, 2016  (GB) ...................................... 1604916

(51) Int. Cl.
*B01J 21/04*    (2006.01)
*B01J 21/06*    (2006.01)
(Continued)

(52) U.S. Cl.
CPC ......... *F01N 3/0222* (2013.01); *B01D 53/945* (2013.01); *B01J 23/44* (2013.01);
(Continued)

(58) Field of Classification Search
CPC ........ F01N 3/0222; F01N 3/035; B01J 21/04; B01J 21/066; B01J 23/10; B01J 23/42;
(Continued)

(56) References Cited

U.S. PATENT DOCUMENTS

| 5,277,880 A | 1/1994 | Sechrist et al. |
| 8,173,087 B2 * | 5/2012 | Wei .......................... F01N 3/033 423/213.2 |

(Continued)

FOREIGN PATENT DOCUMENTS

| CN | 102405104 A | 4/2012 |
| CN | 102787888 A1 | 11/2012 |

(Continued)

*Primary Examiner* — Cam N. Nguyen

(57) ABSTRACT

A catalytic wall-flow monolith filter having three-way catalytic activity for use in an emission treatment system of a positive ignition internal combustion engine comprising a porous filter substrate having a first face and a second face defining a longitudinal direction there between and first and second pluralities of channels extending in the longitudinal direction, wherein the first plurality of channels is open at the first face and closed at the second face and the channels of the first plurality of channels are defined in part by channel wall surfaces, wherein the second plurality of channels is open at the second face and closed at the first face and the channels of the second plurality of channels are defined in part by channel wall surfaces and wherein channel walls between the channel wall surfaces of the first plurality of channels and the channel wall surfaces of the second plurality of channels are porous, wherein a first on-wall coating comprising catalytic material having a layer thickness is present on at least the channel wall surfaces of the first
(Continued)

plurality of channels, wherein the catalytic material on channel wall surfaces of the first plurality of channels comprises one or more platinum group metal selected from the group consisting of (i) rhodium (Rh) only; (ii) palladium (Pd) only; (iii) platinum (Pt) and rhodium (Rh); (iv) palladium (Pd) and rhodium (Rh); and (v) platinum (Pt), palladium (Pd) and rhodium (Rh) and a refractory metal oxide support, wherein: (i) an amount by weight of the one or more platinum group metal, per unit volume of the on-wall coating present on channel wall surfaces of the first plurality of channels varies continually along the longitudinal direction; and/or (ii) the layer thickness of the on-wall coating present on channel wall surfaces of the first plurality of channels varies continually along the longitudinal direction.

23 Claims, 6 Drawing Sheets

(51) Int. Cl.
  B01J 23/10    (2006.01)
  B01J 23/42    (2006.01)
  B01J 23/44    (2006.01)
  B01J 23/46    (2006.01)
  B01J 23/56    (2006.01)
  B01J 23/63    (2006.01)
  B01J 35/04    (2006.01)
  B01J 37/02    (2006.01)
  F01N 3/022    (2006.01)
  F01N 3/035    (2006.01)
  B01D 53/94    (2006.01)

(52) U.S. Cl.
  CPC ............ *B01J 23/464* (2013.01); *B01J 23/63* (2013.01); *B01J 35/04* (2013.01); *B01J 37/0215* (2013.01); *F01N 3/035* (2013.01); B01D 2255/1023 (2013.01); B01D 2255/1025 (2013.01); B01D 2255/40 (2013.01); B01D 2255/908 (2013.01); B01D 2255/9155 (2013.01); F01N 2330/06 (2013.01); F01N 2510/0682 (2013.01); Y02T 10/12 (2013.01)

(58) Field of Classification Search
  CPC . B01J 23/44; B01J 23/464; B01J 23/56; B01J 23/63; B01J 35/04; B01J 37/0215; B01D 53/945
  See application file for complete search history.

(56) References Cited

U.S. PATENT DOCUMENTS

| | | | | |
|---|---|---|---|---|
| 8,211,393 | B2* | 7/2012 | Arnold | B01J 29/06 423/213.2 |
| 9,327,239 | B2* | 5/2016 | Morgan | B01D 53/9454 |
| 9,581,063 | B2* | 2/2017 | Klingmann | F01N 3/206 |
| 2004/0254071 | A1 | 12/2004 | Yan et al. | |
| 2006/0008396 | A1 | 1/2006 | Wursthorn et al. | |
| 2009/0087365 | A1 | 4/2009 | Klingmann et al. | |
| 2009/0193796 | A1 | 8/2009 | Wei et al. | |
| 2010/0212293 | A1 | 8/2010 | Deeba et al. | |
| 2011/0212831 | A1 | 9/2011 | Goto et al. | |
| 2012/0128558 | A1 | 5/2012 | Nunan et al. | |
| 2012/0291420 | A1 | 11/2012 | Kim et al. | |
| 2014/0044626 | A1 | 2/2014 | Greenwell | |
| 2016/0296873 | A1 | 10/2016 | Onoe et al. | |
| 2016/0375429 | A1 | 12/2016 | Chandler et al. | |

FOREIGN PATENT DOCUMENTS

| | | |
|---|---|---|
| CN | 103201018 A | 7/2013 |
| DE | 102016111766 A1 | 12/2016 |
| EP | 2932412 A1 | 2/2015 |
| GB | 2524662 A | 3/2015 |
| JP | 2003154223 A | 5/2003 |
| JP | 2010227743 A | 10/2010 |
| JP | 2011078899 A | 4/2011 |
| JP | 2011212508 A | 10/2011 |
| JP | 2012240007 A | 12/2012 |
| JP | 2013184075 A | 9/2013 |
| JP | 2015521245 A | 7/2015 |
| WO | 9947260 A1 | 9/1999 |
| WO | 2010097634 A1 | 9/2010 |
| WO | 2010131369 A1 | 11/2010 |
| WO | 2011015615 A1 | 2/2011 |
| WO | 2014125296 A1 | 8/2014 |
| WO | 2014162140 A1 | 10/2014 |
| WO | 2015074698 A1 | 5/2015 |

* cited by examiner

GASOLINE PARTICULATE FILTER

CROSS-REFERENCE TO RELATED APPLICATIONS

This national stage application claims priority benefit of PCT Patent Application No. PCT/IB2016/055887, filed Sep. 30, 2016 and GB Patent Applications 1604916.5, filed Mar. 23, 2016, and 1517327.1, filed Sep. 30, 2015, the disclosures of which are incorporated herein by reference in their entireties for all purposes.

FIELD OF THE INVENTION

The present invention relates to a catalytic wall-flow monolith filter suitable for use in a vehicular automobile emission treatment system, in particular an emission treatment system for a positive ignition internal combustion engine, such as a gasoline spark ignition engine. The monolith provides an effective method of remediating engine exhaust streams for use as a gasoline particulate filter.

BACKGROUND OF THE INVENTION

Positive ignition engines cause combustion of a hydrocarbon and air mixture using spark ignition. Contrastingly, compression ignition engines cause combustion of a hydrocarbon—typically diesel fuel—by injecting the hydrocarbon into compressed air. Positive ignition engines can be fuelled by gasoline fuel, gasoline fuel blended with oxygenates including methanol and/or ethanol, liquid petroleum gas or compressed natural gas. Positive ignition engines can be stoichiometrically operated engines or lean-burn operated engines.

Ambient particulate matter (PM) is divided by most authors into the following categories based on their aerodynamic diameter (the aerodynamic diameter is defined as the diameter of a 1 g/cm$^3$ density sphere of the same settling velocity in air as the measured particle):

(i) PM-10—particles of an aerodynamic diameter of less than 10 μm;
(ii) Fine particles of diameters below 2.5 μm (PM-2.5);
(iii) Ultrafine particles of diameters below 0.1 μm (or 100 nm); and
(iv) Nanoparticles, characterised by diameters of less than 50 nm.

Since the mid-1990's, particle size distributions of particulates exhausted from internal combustion engines have received increasing attention due to possible adverse health effects of fine and ultrafine particles. Concentrations of PM-10 particulates in ambient air are regulated by law in the USA. A new, additional ambient air quality standard for PM-2.5 was introduced in the USA in 1997 as a result of health studies that indicated a strong correlation between human mortality and the concentration of fine particles below 2.5 μm.

Interest has now shifted towards nanoparticles generated by diesel and gasoline engines because they are understood to penetrate more deeply into human lungs than particulates of greater size and consequently they are believed to be more harmful than larger particles, extrapolated from the findings of studies into particulates in the 2.5-10.0 μm range.

Size distributions of diesel particulates have a well-established bimodal character that correspond to the particle nucleation and agglomeration mechanisms, with the corresponding particle types referred to as the nuclei mode and the accumulation mode respectively (see FIG. 1). As can be seen from FIG. 1, in the nuclei mode, diesel PM is composed of numerous small particles holding very little mass. Nearly all diesel particulates have sizes of significantly less than 1 μm, i.e. they comprise a mixture of fine, i.e. falling under the 1997 US law, ultrafine and nanoparticles.

Nuclei mode particles are believed to be composed mostly of volatile condensates (hydrocarbons, sulfuric acid, nitric acid etc.) and contain little solid material, such as ash and carbon. Accumulation mode particles are understood to comprise solids (carbon, metallic ash etc.) intermixed with condensates and adsorbed material (heavy hydrocarbons, sulfur species, nitrogen oxide derivatives etc.) Coarse mode particles are not believed to be generated in the diesel combustion process and may be formed through mechanisms such as deposition and subsequent re-entrainment of particulate material from the walls of an engine cylinder, exhaust system, or the particulate sampling system. The relationship between these modes is shown in FIG. 1.

The composition of nucleating particles may change with engine operating conditions, environmental condition (particularly temperature and humidity), dilution and sampling system conditions. Laboratory work and theory have shown that most of the nuclei mode formation and growth occur in the low dilution ratio range. In this range, gas to particle conversion of volatile particle precursors, like heavy hydrocarbons and sulfuric acid, leads to simultaneous nucleation and growth of the nuclei mode and adsorption onto existing particles in the accumulation mode. Laboratory tests (see e.g. SAE 980525 and SAE 2001-01-0201) have shown that nuclei mode formation increases strongly with decreasing air dilution temperature but there is conflicting evidence on whether humidity has an influence.

Generally, low temperature, low dilution ratios, high humidity and long residence times favour nanoparticles formation and growth. Studies have shown that nanoparticles consist mainly of volatile material like heavy hydrocarbons and sulfuric acid with evidence of solid fraction only at very high loads.

Contrastingly, engine-out size distributions of gasoline particulates in steady state operation show a unimodal distribution with a peak of about 60-80 nm (see e.g. FIG. 4 in SAE 1999-01-3530). By comparison with diesel size distribution, gasoline PM is predominantly ultrafine with negligible accumulation and coarse mode.

Particulate collection of diesel particulates in a diesel particulate filter is based on the principle of separating gas-borne particulates from the gas phase using a porous barrier. Diesel filters can be defined as deep-bed filters and/or surface-type filters. In deep-bed filters, the mean pore size of filter media is bigger than the mean diameter of collected particles. The particles are deposited on the media through a combination of depth filtration mechanisms, including diffusional deposition (Brownian motion), inertial deposition (impaction) and flow-line interception (Brownian motion or inertia).

In surface-type filters, the pore diameter of the filter media is less than the diameter of the PM, so PM is separated by sieving. Separation is done by a build-up of collected diesel PM itself, which build-up is commonly referred to as "filtration cake" and the process as "cake filtration".

It is understood that diesel particulate filters, such as ceramic wallflow monoliths, may work through a combination of depth and surface filtration: a filtration cake develops at higher soot loads when the depth filtration capacity is saturated and a particulate layer starts covering the filtration surface. Depth filtration is characterized by somewhat lower filtration efficiency and lower pressure drop than the cake filtration.

Other techniques suggested in the art for separating gasoline PM from the gas phase include vortex recovery.

Emission legislation in Europe from 1 Sep. 2014 (Euro 6) requires control of the number of particles emitted from both diesel and gasoline (positive ignition) passenger cars. For gasoline EU light duty vehicles the allowable limits are: 1000 mg/km carbon monoxide; 60 mg/km nitrogen oxides ($NO_x$); 100 mg/km total hydrocarbons (of which ≤68 mg/km are non-methane hydrocarbons); and 4.5 mg/km particulate matter ((PM) for direct injection engines only). The Euro 6 PM standard will be phased in over a number of years with the standard from the beginning of 2014 being set at $6.0\times10^{12}$ per km (Euro 6) and the standard set from the beginning of 2017 being $6.0\times10^{11}$ per km (Euro 6c). In a practical sense, the range of particulates that are legislated for are between 23 nm and 3 μm.

In the United States, on 22 Mar. 2012, the State of California Air Resources Board (CARB) adopted new Exhaust Standards from 2017 and subsequent model year "LEV III" passenger cars, light-duty trucks and medium-duty vehicles which include a 3 mg/mile emission limit, with a later introduction of 1 mg/mi possible, as long as various interim reviews deem it feasible.

The new Euro 6 (Euro 6 and Euro 6c) emission standard presents a number of challenging design problems for meeting gasoline emission standards. In particular, how to design a filter, or an exhaust system including a filter, for reducing the number of PM gasoline (positive ignition) emissions, yet at the same time meeting the emission standards for non-PM pollutants such as one or more of oxides of nitrogen ($NO_x$), carbon monoxide (CO) and unburned hydrocarbons (HC), all at an acceptable back pressure, e.g. as measured by maximum on-cycle backpressure on the EU drive cycle.

Three-way catalysts (TWCs) are intended to catalyse three simultaneous reactions: (i) oxidation of carbon monoxide to carbon dioxide, (ii) oxidation of unburned hydrocarbons to carbon dioxide and water; and (iii) reduction of nitrogen oxides to nitrogen and oxygen. These three reactions occur most efficiently when the TWC receives exhaust gas from an engine running at or about the stoichiometric point. As is well known in the art, the quantity of carbon monoxide (CO), unburned hydrocarbons (HC) and nitrogen oxides ($NO_x$) emitted when gasoline fuel is combusted in a positive ignition (e.g. spark-ignited) internal combustion engine is influenced predominantly by the air-to-fuel ratio in the combustion cylinder. An exhaust gas having a stoichiometrically balanced composition is one in which the concentrations of oxidising gases ($NO_x$ and $O_2$) and reducing gases (HC and CO) are substantially matched. The air-to-fuel ratio that produces this stoichiometrically balanced exhaust gas composition is typically given as 14.7:1.

The active components in a typical TWC comprise one or both of platinum and palladium in combination with rhodium, or even palladium only (no rhodium), supported on a high surface area oxide, and an oxygen storage component.

Theoretically, it should be possible to achieve complete conversion of $O_2$, $NO_x$, CO and HC in a stoichiometrically balanced exhaust gas composition to $CO_2$, $H_2O$ and $N_2$ (and residual $O_2$) and this is the duty of the TWC. Ideally, therefore, the engine should be operated in such a way that the air-to-fuel ratio of the combustion mixture produces the stoichiometrically balanced exhaust gas composition.

A way of defining the compositional balance between oxidising gases and reducing gases of the exhaust gas is the lambda (λ) value of the exhaust gas, which can be defined according to equation (1) as:

$$\text{Actual engine air-to-fuel ratio/Stoichiometric engine air-to-fuel ratio,} \quad (1)$$

wherein a lambda value of 1 represents a stoichiometrically balanced (or stoichiometric) exhaust gas composition, wherein a lambda value of >1 represents an excess of $O_2$ and $NO_x$ and the composition is described as "lean" and wherein a lambda value of <1 represents an excess of HC and CO and the composition is described as "rich". It is also common in the art to refer to the air-to-fuel ratio at which the engine operates as "stoichiometric", "lean" or "rich", depending on the exhaust gas composition which the air-to-fuel ratio generates: hence stoichiometrically-operated gasoline engine or lean-burn gasoline engine.

It should be appreciated that the reduction of $NO_x$ to $N_2$ using a TWC is less efficient when the exhaust gas composition is lean of stoichiometric. Equally, the TWC is less able to oxidise CO and HC when the exhaust gas composition is rich. The challenge, therefore, is to maintain the composition of the exhaust gas flowing into the TWC at as close to the stoichiometric composition as possible.

Of course, when the engine is in steady state it is relatively easy to ensure that the air-to-fuel ratio is stoichiometric. However, when the engine is used to propel a vehicle, the quantity of fuel required changes transiently depending upon the load demand placed on the engine by the driver. This makes controlling the air-to-fuel ratio so that a stoichiometric exhaust gas is generated for three-way conversion particularly difficult. In practice, the air-to-fuel ratio is controlled by an engine control unit, which receives information about the exhaust gas composition from an exhaust gas oxygen (EGO) (or lambda) sensor: a so-called closed loop feedback system. A feature of such a system is that the air-to-fuel ratio oscillates (or perturbates) between slightly rich of the stoichiometric (or control set) point and slightly lean, because there is a time lag associated with adjusting air-to-fuel ratio. This perturbation is characterised by the amplitude of the air-to-fuel ratio and the response frequency (Hz).

When the exhaust gas composition is slightly rich of the set point, there is a need for a small amount of oxygen to consume the unreacted CO and HC, i.e. to make the reaction more stoichiometric. Conversely, when the exhaust gas goes slightly lean, the excess oxygen needs to be consumed. This was achieved by the development of the oxygen storage component that liberates or absorbs oxygen during the perturbations. The most commonly used oxygen storage component (OSC) in modern TWCs is cerium oxide ($CeO_2$) or a mixed oxide containing cerium, e.g. a Ce/Zr mixed oxide.

As described herein, a stoichiometrically-operated positive ignition engine should be understood herein as being an engine controlled by systems such as those including closed loop feedback so that three-way catalysis can be achieved over the TWC. A lean-burn-operated positive ignition engine should be understood to be an engine controlled in such as way that for some of the engine duty cycle the engine operates lean of the stoichiometric point and for dome of the engine duty cycle the engine operates at or about the stoichiometric point. Lean-burn operation can utilise so-called stratified fuel charge and/or can be used during light-load running conditions, whereas stoichiometric operation (using non-stratified homogeneous air-fuel mixture) can be used for moderate load conditions. The engine may also operate a full power mode for rapid acceleration and heavy load such as when climbing a hill, using a homogeneous air-fuel mixture slightly richer than stoichiometric.

The fuel injection control required to operate lean-burn positive ignition engines is obtained through highly pressurised common rail fuel injections systems and the engines are referred to as gasoline Direct Injection (GDI) engines, alternatively spark ignition direct injection (SIDI) or Fuel Stratified Injection (FSI).

There has been a number of recent efforts to combine TWCs with filters for meeting the Euro 6 emission standards, including US 2009/0193796, which discloses an emission treatment system downstream of a gasoline direct injection engine for treatment of an exhaust gas comprising hydrocarbons, carbon monoxide, nitrogen oxides and particulates, the emission treatment system optionally comprising a particulate trap zone-coated with an oxidation catalyst comprising platinum group metal consisting of platinum and palladium.

WO 2010/097634 A1 discloses a filter for filtering particulate matter from exhaust gas emitted from a positive ignition engine, which filter comprising a porous substrate having inlet surfaces and outlet surfaces, wherein the inlet surfaces are separated from the outlet surfaces by a porous structure containing pores of a first mean pore size, wherein the porous substrate is coated with a wash coat comprising a plurality of solid particles wherein the porous structure of the wash coated porous substrate contains pores of a second mean pore size, and wherein the second mean pore size is less than the first mean pore size.

US 2009/0087365 discloses a catalytically active particulate filter for removing particulates, carbon monoxide (CO) hydrocarbons (HC) and nitrogen oxides (NOx) from the exhaust gas of internal combustion engines operated with a predominantly stoichiometric air/fuel mixture, comprising: a filter body and a catalytically active coating which consists of first and second layer arranged one on top of the other, the second layer being in direct contact with incoming exhaust gas and completely covering the first layer on the exhaust gas side, and both layers comprising alumina, the alumina in the first layer being catalytically activated with palladium, while the second layer comprises rhodium as the catalytically active component, and only the second layer additionally comprising an oxygen-storing cerium/zirconium mixed oxide.

WO 2014/125296 discloses a positive ignition engine comprising an exhaust system for a vehicular positive ignition internal combustion engine, which exhaust system comprising a filter for filtering particulate matter from exhaust gas emitted from the vehicular positive ignition internal combustion engine, which filter comprising a porous substrate having inlet surfaces and outlet surfaces, wherein the porous substrate is coated at least in part with a three-way catalyst washcoat comprising a platinum group metal and a plurality of solid particles, wherein the plurality of solid particles comprises at least one base metal oxide and at least one oxygen storage component which is a mixed oxide or composite oxide comprising cerium, wherein the mixed oxide or composite oxide comprising cerium and/or the at least one base metal oxide has a median particle size (D50); less than 1 µm and wherein the platinum group metal is selected from the group consisting of: (a) platinum and rhodium; (b) palladium and rhodium; (c) platinum, palladium and rhodium; (d) palladium only; or (e) rhodium only.

US 2006/0008396 A1 discloses an exhaust treatment apparatus having a body through which the exhaust of an internal combustion engine can flow, which body has regions with different flow resistances; the body has flow regions that are separate from one another and are each delimited by a delimiting device and each have at least one inflow opening that the exhaust can act on; the different flow resistances in the regions are produced by differently embodied delimiting devices.

WO 99/47260 discloses a monolith coating apparatus suitable for forming the coatings described herein. The new emission standards will force the use of filters for filtering particulate matter from exhaust gas emitted from positive ignition internal combustion engines. However, because the size of such particulate matter is much finer than particulate matter emitted from diesel engines, the design challenge is to filter particulate matter from positive ignition exhaust gas but at acceptable back pressure.

It is envisaged that a minimum of particle reduction for a three-way catalysed particulate filter to meet the Euro 6 PM number standard relative to an equivalent flowthrough catalyst is ≥50%. Additionally, while some backpressure increase for a three-way catalysed wallflow filter relative to an equivalent flowthrough catalyst is inevitable, in our experience peak backpressure over the MVEG-B drive cycle (average over three tests from "fresh") for a majority of passenger vehicles should be limited to <200 mbar, such as <180 mbar, <150 mbar and preferably <120 mbar e.g. <100 mbar.

Inventors have now discovered, very surprisingly, that inter alia by adjusting the D90 of the TWC washcoat components, and using appropriate coating methods, that it is possible to obtain on-wall wedge shaped coating profiles, wherein an amount by weight of the one or more platinum group metal, per unit volume of the on-wall coating present on channel wall surfaces of the first plurality of channels varies continually along the longitudinal direction; and/or the layer thickness of the on-wall coating present on channel wall surfaces of the first plurality of channels varies continually along the longitudinal direction. Such coating arrangements can improve TWC activity and/or reduce backpressure (also referred to as pressure drop) across the filter.

SUMMARY OF THE INVENTION

According to a first aspect there is provided a catalytic wall-flow monolith filter having three-way catalytic activity for use in an emission treatment system of a positive ignition internal combustion engine, wherein the wall-flow monolith filter comprises a porous filter substrate, the porous filter substrate having a first face and a second face defining a longitudinal direction therebetween and first and second pluralities of channels extending in the longitudinal direction, wherein the first plurality of channels is open at the first face and closed at the second face and the channels of the first plurality of channels are defined in part by channel wall surfaces, wherein the second plurality of channels is open at the second face and closed at the first face and the channels of the second plurality of channels are defined in part by channel wall surfaces and wherein channel walls between the channel wall surfaces of the first plurality of channels and the channel wall surfaces of the second plurality of channels are porous, wherein a first on-wall coating comprising catalytic material having a layer thickness is present on at least the channel wall surfaces of the first plurality of channels, wherein the catalytic material on channel wall surfaces of the first plurality of channels comprises one or more platinum group metal selected from the group consisting of (i) rhodium (Rh) only; (ii) palladium (Pd) only; (iii) platinum (Pt) and rhodium (Rh); (iv) palladium (Pd) and rhodium (Rh); and (v) platinum (Pt), palladium (Pd) and rhodium (Rh) and a refractory metal oxide support, wherein:

(a) an amount by weight of the one or more platinum group metal, per unit volume of the on-wall coating present on channel wall surfaces of the first plurality of channels varies continually along the longitudinal direction; and/or (b) the layer thickness of the on-wall coating—or substantially on-wall coating—present on channel wall surfaces of the first plurality of channels varies continually along the longitudinal direction.

The platinum group metals are defined according to (i)-(v). It is possible, however, for one or more other platinum group metals on the face of it excluded by the definitions of (i)-(v) e.g. iridium, rhenium, osmium or one of platinum, palladium or rhodium etc. to be present in trace or de minimis quantities, such as less than 3 wt %, such as <2 wt % or <1 wt % or <0.5 wt % and still be within the scope of the claim.

Any reference to "on-wall" or "substantially on-wall" as used herein with reference to coating refers to a wall-flow filter substrate where a liquid comprising a catalytic material has been coated onto a surface of the wall (i.e. of the filter substrate), such that >50% of the catalyst component is disposed on a surface of the wall, particularly >60% of the catalyst component, preferably >70% of the catalyst component (e.g. >80% of the catalyst component), and more preferably >90% of the catalyst component. When the liquid comprises a plurality of catalyst components, then typically >50% of all of the catalyst components are disposed on a surface of the wall, particularly >60% of all of the catalyst components, preferably >70% of all of the catalyst components (e.g. >80% of all of the catalyst components), and more preferably >90% of all of the catalyst components.

Any reference to "in-wall" or "substantially in-wall" as used herein with reference to coating refers to a wall-flow filter substrate where a liquid comprising a catalytic material has been coated onto a surface of the wall (i.e. of the filter substrate), such that >50% of the catalyst component is disposed within the wall, particularly >60% of the catalyst component, preferably >70% of the catalyst component (e.g. >80% of the catalyst component), and more preferably >90% of the catalyst component. When the liquid comprises a plurality of catalyst components, then typically >50% of all of the catalyst components are disposed within the wall, particularly >60% of all of the catalyst components, preferably >70% of all of the catalyst components (e.g. >80% of all of the catalyst components), and more preferably >90% of all of the catalyst components. For any value of in-wall or substantially in-wall coating less than 100%, the remainder will be visible using appropriate techniques, e.g. SEM, as an on-wall coating and as such will have an on-wall coating thickness. Where an in-wall coating is visible at a channel wall surface, it will usually be seen at a surface of one or other or both of the first or second channel wall surfaces. It will be understood, however, that the intention is to insert the coating in-wall and for this purpose the coating is arranged so that it is preferentially received as entirely as possible in-wall. Parameters that can promote in-wall location include selection of an appropriate D90 by milling or selection of sol components, preferably to less than 5 µm, and appropriate selection of catalyst loading so that the in-wall porosity does not become overfilled, thus encouraging overspill of in-wall coating so that it lies on-wall.

By composition, it is meant a single fixed composition which is homogeneous throughout the layer.

The amount by weight of the first platinum group metal and/or the amount by weight of second platinum group metal, per unit area of the coating, varies continually along the longitudinal direction. This could be achieved by varying the density of the coating, or by allowing a solution of platinum group metals to wick into a layer of refractory metal oxide coated on the wall-flow monolith filter but it is more readily achieved by varying the coating thickness in the longitudinal direction.

Preferably the amount by weight of the first and/or second platinum group metals in the coating varies linearly within the coating along the longitudinal direction. That is, the gradient of the change in amount remains constant.

The present invention will now be further described. In the following passages different aspects of the invention are defined in more detail. Each aspect so defined may be combined with any other aspect or aspects unless clearly indicated to the contrary. In particular, any feature indicated as being preferred or advantageous may be combined with any other feature or features indicated as being preferred or advantageous.

The present invention relates to a catalytic filter monolith for use in a vehicular automobile emission treatment system, in particular an emission treatment system for a positive ignition internal combustion engine such as a gasoline spark ignition engine. Positive ignition internal combustion engines include gasoline direct injection engines, which can operate lean of the stoichiometric point and stoichiometrically operated engines, such as port fuel injected engines, also known as multipoint fuel injection engines.

The porous substrate has a first face and a second face defining a longitudinal direction therebetween and at least a first plurality of channels extending in the longitudinal direction and providing a first plurality of inner surfaces. In use, one of the first face and the second face will be the inlet face for exhaust gases and the other will be the outlet face for the treated exhaust gases. Preferred is a wall flow filter, wherein the monolith further comprises a second plurality of channels extending in the longitudinal direction, wherein the first plurality of channels is open at the first face and closed at the second face and provides a first plurality of inner surfaces, and wherein the second plurality of channels is open at the second face and closed at the first face and provides a second plurality of inner surfaces, and wherein the coating is optionally further provided on the second plurality of inner surfaces. Wall-flow monoliths are well-known in the art for use in particulate filters. They work by forcing a flow of exhaust gases (including particulate matter) to pass through walls formed of a porous material. Such filters are discussed in more detail below.

In a catalytic monolith filter according to the invention, a maximum on-wall coating thickness of catalytic material present on the first plurality of surfaces in the longitudinal direction can be up to 150 microns. Wall-flow filter channels typically include at least one side, e.g. they have a square cross-section or a hexagonal cross section. Where the channels have a cross-sectional shape having at least one flat side, according to the invention, the thickness of the on-wall coating is measured, e.g. by SEM, at a mid-point between corners in the cross section shape.

Preferably the coating has a thickness of from 10 to 150 microns, more preferably from 50 to 100 microns.

Preferably the thickness of at least one of the first and second layers varies along the longitudinal direction by from 10 to 100 microns, more preferably from 20 to 50 microns. That is, the layer may increase from 0 to 50 microns along the length of the first channel.

Preferably, a maximum weight of the one or more platinum group metal and/or a maximum layer thickness present on channel wall surfaces of the first plurality of channels is at the open end of the first plurality of channels. The term "wedge-shaped profile" is used herein interchangeably with this definition.

Preferably, the catalytic material on the channel wall surfaces of the first plurality of channels comprises Pd:Rh at a ratio of 1:1 or higher.

Alternatively, the catalytic material on the channel wall surfaces of the first plurality of channels comprises Pd as the only platinum group metal. Alternatively, the catalytic material on the channel wall surfaces of the first plurality of channels comprises Rh as the only platinum group metal.

Preferably, an on-wall coating comprising catalytic material having a layer thickness is further provided on the wall surfaces of the second plurality of channels, wherein an on-wall coating comprising catalytic material having a layer thickness is present on the channel wall surfaces of the second plurality of channels, wherein the catalytic material on channel wall surfaces of the second plurality of channels comprises one or more platinum group metal selected from the group consisting of (i) rhodium (Rh) only; (ii) palladium (Pd) only; (iii) platinum (Pt) and rhodium (Rh); (iv) palladium (Pd) and rhodium (Rh); and (v) platinum (Pt), palladium (Pd) and rhodium (Rh) and a refractory metal oxide support, and wherein:

(i) an amount by weight of the one or more platinum group metal, per unit volume of the on-wall coating present on channel wall surfaces of the second plurality of channels varies continually along the longitudinal direction; and/or (ii) the layer thickness of the on-wall coating present on channel wall surfaces of the second plurality of channels varies continually along the longitudinal direction.

In a further alternative described in Example 4, by adjusting the D90 of at least one washcoat composition applied via the first plurality of channels or the second plurality of channels, it is possible to obtain a product comprising a substantially in-wall coating and a second, on-wall coating comprising catalytic material having a layer thickness is present in the first plurality of channels in addition to the first on-wall coating of the first plurality of channels, wherein the catalytic material of the second on-wall coating of the first plurality of channels and the substantially in-wall coating comprises one or more of platinum group metal selected from the group consisting of (i) rhodium (Rh) only; (ii) palladium (Pd) only; (iii) platinum (Pt) and rhodium (Rh); (iv) palladium (Pd) and rhodium (Rh); and (v) platinum (Pt), palladium (Pd) and rhodium (Rh) and a refractory metal oxide support, wherein, in the second on-wall coating of the first plurality of channels in addition to the first on-wall coating of the first plurality of channels:

(i) an amount by weight of the one or more platinum group metal, per unit volume of the on-wall coating present on channel wall surfaces of the first plurality of channels varies continually along the longitudinal direction; and/or (ii) the layer thickness of the second on-wall coating present on channel wall surfaces of the first plurality of channels varies continually along the longitudinal direction.

Alternatively, channel walls defined by the channel wall surfaces of the first plurality of channels and the channel wall surfaces of the second plurality of channels are porous and comprise a second, in-wall—or substantially in-wall—coating comprising catalytic material, wherein the in-wall catalytic material comprises one or more platinum group metal selected from the group consisting of (i) rhodium (Rh) only; (ii) palladium (Pd) only; (iii) platinum (Pt) and rhodium (Rh); (iv) palladium (Pd) and rhodium (Rh); and (v) platinum (Pt), palladium (Pd) and rhodium (Rh) and a refractory metal oxide support, and wherein the in-wall—or substantially in-wall—coating comprising catalytic material is the same as or is different from the catalytic material comprised in the on-wall coating present on channel wall surfaces of the first plurality of channels.

The maximum weight of the one or more platinum group metal and/or a maximum layer thickness present on channel wall surfaces of the second plurality of channels is preferably at the open end of the second plurality of channels. The maximum weight of the one or more platinum group metal and/or maximum layer thickness present in the second on-wall coating of the first plurality of channels is preferably at the closed end of the first plurality of channels.

The catalytic material on the channel wall surfaces of the second plurality of channels, the second on-wall coating of the first plurality of channels or the in-wall coating comprises Pd:Rh at a ratio of 1:1 or higher.

Alternatively, the catalytic material on the channel wall surfaces of the second plurality of channels, in the second on-wall coating of the first plurality of channels or in the in-wall coating comprises Pd as the only platinum group metal and is different from the platinum group metal or combination of platinum group metals in the first plurality of channels or in the first on-wall coating of the first plurality of channels.

Alternatively, the catalytic material on the channel wall surfaces of the second plurality of channels, in the second on-wall coating of the first plurality of channels comprises Rh as the only platinum group metal and is different from the platinum group metal or combination of platinum group metals in the first plurality of channels or in the first on-wall coating of the first plurality of channels.

Preferably, the composition of the catalytic material in the first plurality of channels is the same as that in the second plurality of channels, in the second on-wall coating in the first plurality of channels or in the in-wall coating. However, in certain arrangements or applications it can also be preferable to have different catalytic compositions in the first and second pluralities of channels or in the two different catalytic compositions present in the first plurality of channels or the second plurality of channels. Such difference is obligatory in the case where the second coating is in-wall. For example, the catalytic material on channel wall surfaces of the first plurality of channels and/or on channel wall surfaces of the second plurality of channels or the second in-wall coating preferably comprise an oxygen storage component (OSC). It may be preferable to include OSC in the catalytic material of the plurality of channels disposed upstream in the system according to the invention to combust soot opportunistically during fuel cuts at vehicular automobile decelerations. Alternatively, for stoichiometrically operated engines, it may be preferable to have no OSC in the upstreamward-disposed plurality of channels, but OSC in the downstreamward-disposed plurality of channels or in-wall coating to avoid consuming oxygen that could otherwise promote soot oxidation.

The first plurality of channels can include Pd as the only platinum group metal or Pt and Pd and the second plurality of channels or second in-wall coating can include Rh as the only platinum group metal or Pt and Rh. In this arrangement, the OSC can be present only in the second plurality of channels or second in-wall coating or only in the first plurality of channels depending on which set of channels are to be disposed upstream, according to the description in the preceding paragraph.

Alternatively, the first plurality of channels can include Rh as the only platinum group metal or Pt and Rh and the second plurality of channels or second in-wall coating can include Pd as the only platinum group metal or Pt and Pd, with the OSC present only in the first plurality of channels of the second plurality of channels or second in-wall coating, depending on which set of channels are to be disposed upstream, according to the description hereinabove.

According to the first aspect of the invention, the catalytic wall-flow substrate filter has three-way activity. The catalytic material in the first plurality of channels and/or the second plurality of channels can be a so-called fully formulated three-way catalyst, e.g. containing the platinum group metals palladium and rhodium, a refractory metal oxide support and an OSC. However, it is also possible that the filter substrate as a whole has three-way activity, but the catalytic material of the first plurality of channels and/or the second plurality of channels when taken alone, e.g. Rh only or Pd only each supported on alumina, does not have the same activity as a fully formulated three-way catalyst, but the combination of both the first and second pluralities of channels or the combination of both the first plurality of channels and the in-wall coating has the required activity, either the same as or similar to a fully formulated three-way catalyst. Such an arrangement can be referred to as a composite TWC, wherein the wall-flow filter as a whole comprises all the components of a fully formulated TWC, but the individual components making up the fully formulated TWC are applied to the first or second plurality of channels or in-wall.

The OSC comprises or consists of one or more mixed oxides. The OSC can be ceria or a mixed oxide comprising ceria. Preferably the OSC comprises a ceria and zirconia mixed oxide; a mixed oxide of cerium, zirconium, and neodymium; a mixed oxide of praseodymium and zirconium; a mixed oxide of cerium, zirconium and praseodymium; or a mixed oxide of praseodymium, cerium, lanthanum, yttrium, zirconium and neodymium. An OSC is an entity that has multi-valence state and can actively react with oxidants such as oxygen or nitrous oxides under oxidative conditions, or reacts with reductants such as carbon monoxide (CO) or hydrogen under reducing conditions. Examples of suitable oxygen storage components include ceria. Praseodymia can also be included as an OSC. Delivery of an OSC to the washcoat layer can be achieved by the use of, for example, mixed oxides. For example, ceria can be delivered by a mixed oxide of cerium and zirconium, and/or a mixed oxide of cerium, zirconium, and neodymium. For example, praseodymia can be delivered by a mixed oxide of praseodymium and zirconium, a mixed oxide of cerium, zirconium and praseodymium and/or a mixed oxide of praseodymium, cerium, lanthanum, yttrium, zirconium, and neodymium.

The mixed oxide comprising ceria and zirconia can have a pyrochlore structure, i.e. $A_2B_2O_7$, or a similar structure such as disordered fluorite ($[AB]_2O_7$) or so-called delta (δ)-phase ($A_4B_3O_{12}$), wherein "A" represents a trivalent cation and "B" represents a tetravalent cation. Such materials have a relatively low surface area (e.g. less than 15 $m^2/g$) and a relatively high bulk density, but good oxygen storage and release properties. The use of high bulk density OSC components can result in a reduced backpressure filter according to the invention compared with more typical OSC ceria-zirconia mixed oxides having a similar oxygen storage/release activity.

Furthermore, at least one inventor has found that a praseodymium-doped mixed oxide of cerium and zirconium promotes soot oxidation in the catalytic material in the first plurality of channels. Therefore, preferably where the first plurality of channels includes OSC, e.g. in a system for a gasoline direct injection engine generating particulate matter, the first plurality of channels comprises a OSC comprising praseodymium. In this regard, the praseodymium can be present at 2-10 wt % based on the total content of the mixed oxide.

Without wishing to be bound by any theory, from the experimental results presented in the Examples hereinbelow, inventors believe that the soot combustion promotion effect of the praseodymium is not related to a direct catalytic effect, e.g. praseodymium contacting the soot. Instead, inventors believe that the effect is related to a promotion of soot oxidation by the cerium component. In particular, inventors suggest that the observed improved soot combustion effect is related to a metastabilising effect of praseodymium on the cubic fluorite structure of the ceria-zirconia solid solution and promotion of dissociated oxygen anions diffused in the bulk of the solid through the oxygen vacancies and associated spillover oxygen between the $4^+/3^+$ redox states of the cerium.

Where the catalytic wall-flow monolith filter according to the invention comprises an OSC comprising ceria and one or more mixed oxides comprising ceria, a weight ratio of the OSC to the refractory metal oxide support, preferably alumina or doped alumina, is preferably from 65:35 to 85:15, more preferably from 70:30 to 80:20 and most preferably about 75:25. Whereas it is conventional to provide the alumina and the OSC in a roughly 50:50 ratio when the TWC is provided as a separate unit, the inventors have found that when providing a combined particulate filter and catalytic treatment unit, the ratio of about 75:25 provided far better process efficiency (see Examples). In particular, the additional oxygen storage capacity allows the device to operate across a range of conditions from start-up to full temperature, without having insufficient thermal mass to function or inability to adhere to the substrate. As a result of the improved oxygen storage capacity, NOx conversion under most conditions is improved. It has been found that above an upper limit of 85:15 OSC:alumina, the coating is too thermally unstable to function effectively.

The refractory metal oxide support can comprise alumina or doped alumina. Alumina dopants include silicon and lanthanum. The refractory metal oxide can also comprise the OSC.

The catalytic materials can also include catalyst promoters. One preferred group of catalyst promoters is alkaline earth metals, preferably barium and/or strontium, which can stabilise palladium dispersions. Pt can also stabilise Pd and vice versa.

The porous substrate can be a ceramic porous substrate, such as cordierite, aluminium titanate and/or silicon carbide. The filter substrate may have a porosity of 40 to 75%, such as 45 to 70% (e.g. 45 to 65%) or 50 to 60%. The mean pore size may be determined using mercury porosimetry and x-ray tomography according to conventional methods.

The wall-flow filter substrate can have a mean pore size of 10 to 25 μm, such as 12 to 20 μm. The filter substrate may have a pore size distribution of from 0.35 to 0.60, such as to 0.40 to 0.55 [e.g. where the pore size distribution is represented by (d50−d10)/d50].

Preferably the mean cross-sectional width of the first and second pluralities of channels is constant. However, the plurality of channels that serves as the inlet in use can have a greater mean cross-sectional width than the plurality of channels that serves as the outlet. Preferably, the difference is at least 10%. This affords an increased ash storage capacity in the filter, meaning that a lower regeneration frequency can be used. The cross-sectional width of the channels can be measured by SEM.

Preferably the mean minimum thickness of the substrate between adjacent channels is from 8 to 20 mil (where a "mil" is 1/1000 inch) (0.02 to 0.05 cm). This can be measured with SEM. Since the channels are preferably parallel and preferably have a constant width, the minimum wall thickness between adjacent channels is preferably constant. As will be appreciated, it is necessary to measure the mean minimum distance to ensure a reproducible measurement. For example, if the channels have a circular cross-section and are closely packed, then there is one clear point when the wall is thinnest between two adjacent channels.

Preferably within a plane orthogonal to the longitudinal direction, the monolith has from 100 to 500 channels per square inch, preferably from 200 to 400. For example, on the first face, the density of open first channels and closed second channels is from 200 to 400 channels per square inch. The channels can have cross sections that are rectangular, square, circular, oval, triangular, hexagonal, or other polygonal shapes.

In order to facilitate the passage of gases to be treated through the channel walls, the monolith is formed out of a porous substrate. The substrate also acts as a support for holding catalytic material. Suitable materials for forming the porous substrate include ceramic-like materials such as cordierite, silicon carbide, silicon nitride, zirconia, mullite, spodumene, alumina-silica-magnesia or zirconium silicate, or of porous, refractory metal. Wall-flow substrates may also be formed of ceramic fiber composite materials. Preferred wall-flow substrates are formed from cordierite and silicon carbide. Such materials are able to withstand the environment, particularly high temperatures, encountered in treating the exhaust streams and can be made sufficiently porous. Such materials and their use in the manufacture of porous monolith substrates is well known in the art.

According to a second aspect, the invention provides an emission treatment system for treating a flow of a combustion exhaust gas from a positive ignition internal combustion engine, the system comprising the catalytic wall-flow monolith filter according to any of the preceding claims, wherein the first face is disposed upstream from the second face. Alternatively, the second face can be disposed upstream from the first face.

The exhaust system can comprise additional components, such as a TWC composition applied to a honeycomb monolith (flow through) substrate and disposed either upstream or downstream of the catalytic wall flow monolith filter according to the invention. In the upstream or downstream TWC, unburned gaseous and non-volatile hydrocarbons (volatile organic fraction) and carbon monoxide are largely combusted to form carbon dioxide and water. In addition, nitrogen oxides are reduced to form nitrogen and water. Removal of substantial proportions of the VOF using the oxidation catalyst, in particular, helps to prevent too great a deposition of particulate matter (i.e., clogging) on the downstream filter according to the present invention.

As desired, the exhaust system can also include additional components. For example in exhaust systems applicable particularly to lean-burn engines, a NOx trap can be disposed either upstream of the filter according to the invention instead of or in addition to the upstream TWC composition applied to a honeycomb monolith (flow through) substrate. A NOx trap, also known as a $NO_x$ absorber catalysts (NACs), are known e.g. from U.S. Pat. No. 5,473,887 and are designed to adsorb nitrogen oxides ($NO_x$) from lean (oxygen rich) exhaust gas (lambda>1) during lean running mode operation and to desorb the $NO_x$ when the oxygen concentration in the exhaust gas is decreased (stoichiometric or rich running modes). Desorbed $NO_x$ may be reduced to $N_2$ with a suitable reductant, e.g. gasoline fuel, promoted by a catalyst component, such as rhodium or ceria, of the NAC itself or located downstream of the NAC.

Downstream of the NAC, a SCR catalyst can be disposed to receive the outlet of the NAC and to provide further emissions treatment of any ammonia generated by the NAC with a selective catalytic reduction catalyst for reducing oxides of nitrogen to form nitrogen and water using the ammonia as reductant. Suitable SCR catalysts include molecular sieves, particularly aluminosilicate zeolites, preferably having the CHA, AEI, AFX or BEA framework type according to the International Zeolite Association, promoted e.g. by ion exchange with copper and/or iron or oxides thereof.

The invention can also comprise a positive ignition engine as described herein comprising the exhaust system according to the second aspect of the invention. Additionally, the present invention can comprise a vehicle, such as a passenger vehicle, comprising an engine according to the invention.

According to a third aspect, the invention provides a method of manufacturing a catalytic wall-flow monolith filter according to the first aspect of the invention, comprising:

providing a porous filter substrate having a first face and a second face defining a longitudinal direction therebetween and first and second pluralities of channels extending in the longitudinal direction, wherein the first plurality of channels is open at the first face and closed at the second face and the channels of the first plurality of channels are defined in part by channel wall surfaces, wherein the second plurality of channels is open at the second face and closed at the first face and the channels of the second plurality of channels are defined in part by channel wall surfaces and wherein channel walls between the channel wall surfaces of the first plurality of channels and the channel wall surfaces of the second plurality of channels are porous, contacting the first face of the porous filter substrate with a liquid slurry washcoat containing a catalytic material; drawing the liquid slurry washcoat into the first plurality of channels by application of a vacuum, wherein at least one of: a liquid catalytic washcoat solids content; a liquid catalytic washcoat rheology; a porosity of the porous filter substrate; a mean pore size of the porous filter substrate; a liquid catalytic washcoat volumetric mean particle size; and a liquid catalytic washcoat D90 (by volume), is pre-selected so that at least some of the catalytic material remains on channel wall surfaces of the first plurality of channels or both remains on channel wall surfaces of the first plurality of channels and permeates channel walls of the first plurality of channels; and drying and calcining the coated filter substrate, wherein the catalytic material in the liquid slurry washcoat comprises one or more platinum group metal selected from the group consisting of (i) rhodium (Rh) only; (ii) palladium (Pd) only; (iii) platinum (Pt) and rhodium (Rh); (iv) palladium (Pd) and rhodium (Rh); and (v) platinum (Pt), palladium (Pd) and rhodium (Rh) and a refractory metal oxide support, such that:

(i) an amount by weight of the one or more platinum group metal, per unit volume of the on-wall coating present on channel wall surfaces of the first plurality of channels varies continually along the longitudinal direction; and/or (ii) the layer thickness of the on-wall coating present on channel wall surfaces of the first plurality of channels varies continually along the longitudinal direction.

The liquid catalytic washcoat D90 (by volume) can have a particle size (i.e. a primary particle size) greater than 0.4 μm. Preferably, at least 90% of the particles have a particle size greater than 0.5 μm, more preferably greater than 1 μm, and even more preferably greater than 2 μm.

At least 90% of the particles in the liquid can have a particle size (i.e. a primary particle size) less than 25 μm. Preferably, at least 90% of the particles have a particle size less than 20 μm, more preferably less than 15 μm, and even more preferably less than 10 μm.

Particle size measurements are obtained by Laser Diffraction Particle Size Analysis using a Malvern Mastersizer 2000, which is a volume-based technique (i.e. D(v, 0.1), D(v, 0.5), D(v, 0.9) and D(v, 0.98) may also be referred to as DV10, DV50, DV90 and DV98 respectively (or D10, D50, D90 and D98 respectively) and applies a mathematical Mie theory model to determine a particle size distribution. Diluted washcoat samples were prepared by sonication in distilled water without surfactant for 30 seconds at 35 watts.

The first face is preferably disposed uppermost, the liquid slurry washcoat is applied to the first face and the vacuum is applied from the second face.

According to a fourth aspect, the invention provides a method of treating a combustion exhaust gas from a positive ignition internal combustion engine containing oxides of nitrogen ($NO_x$), carbon monoxide (CO) unburned hydrocarbon fuel (HC) and particulate matter (PM), which method comprising contacting the exhaust gas with a catalytic wall flow filter according to the first aspect of the invention.

The application of catalytic material to the porous filter substrate may be characterised as "on-wall" application or both "on-wall" and "in-wall" application. The former is characterised by the formation of a coating layer on a surface of a channel. The latter is characterised by the infiltration of catalytic material into the pores within the porous material. The techniques for "in-wall" or "on-wall" application can depend on the viscosity of the material applied, the application technique (spraying or dipping, for example) and the presence of different solvents. Such application techniques are known in the art. The viscosity of the washcoat is influenced, for example, by its solids content. It is also influenced by the particle size distribution of the washcoat—a relatively flat distribution will give a different viscosity to a finely milled washcoat with a sharp peak in its particle size distribution—and rheology modifiers such as guar gums and other gums.

The method of making a catalytic wall-flow monolith filter according to the first aspect of the invention is an adaptation of the method disclosed. UK patent publication no. 2524662 (the entire contents of which are incorporated herein by reference) discloses a method of coating a filter substrate comprising a plurality of channels and comprising the steps of (a) introducing a pre-determined amount of liquid into a containment means at an upper end of the filter substrate; and (b) draining the liquid from the containment means into the filter substrate. The method is suitable for forming on-wall coatings such as membrane type coatings on the surface of the channels walls of the substrate.

In the method disclosed in UK patent publication no. 2524662, a relatively low viscosity is used and preferably no thickener is added. For example, it is preferable in the method that the liquid has a viscosity from 5 to 100 cP, such as 10 to 100 cP, particularly 20 to 90 cP, preferably 25 to 80 cP, and even more preferably 35 to 65 cP (as measured at 20° C. on a Brookfield RV DVII+ Extra Pro viscometer using a SC4-27 spindle at 50 rpm spindle speed). The liquid has a viscosity that allows the liquid to gradually drain under gravity into the filter substrate.

Generally, the vacuum is from −0.5 to −50 kPa (below atmospheric pressure), particularly from −1 to −30 kPa, and preferably −5 to −20 kPa (e.g. the vacuum applied to the filter substrate). The vacuum may be continuously applied for 0.25 to 15 seconds, such as 0.5 to 35 seconds, preferably 1 to 7.5 seconds (e.g. 2 to 5 seconds). In general, high vacuum strengths and/or longer vacuum durations result in a larger proportion of in-wall coating.

We have now found that it is possible to achieve a layer thickness of the on-wall coating—or substantially on-wall coating—that varies continually along the longitudinal direction by using a higher viscosity liquid i.e. >100 cP slurry or washcoat. This arrangement has significant advantages as shown in the accompanying Examples.

Preferably the ratio by weight of the OSC to the one or more platinum group metals is from 2.7 $g/in^3$ OSC: 2/$gft^3$ PGM to 0.187 $g/in^3$ to 150 $g/ft^3$ PGM.

Preferably the total catalytic material present on the wall-flow monolith filter calculated as the difference between an uncoated weight and a coated weight is >50 g/l, such as 50 to 244.1 g/l, e.g. 100 to 200 g/l, such as <200 g/l and 125 to 175 g/l TWC compositions are generally provided in washcoats. Layered TWC catalysts can have different compositions for different layers. Traditionally, TWC catalysts applied to flow-through substrate monoliths, wherein channels are open at both ends, can comprise washcoat layers having loadings of up to 2.5 $g/in^3$ and total loadings of 5 $g/in^3$ or more. For use with particulate traps, due to backpressure constraints, TWC catalyst washcoat layer are preferably from 3.6 $g/in^3$ to 0.1 $g/in^3$, preferably from 2.4 $g/in^3$ to 0.25 $g/in^3$, and most preferred from 1.6 $g/in^3$ to 0.5 $g/in^3$. This provides sufficient catalyst activity to oxidize carbon dioxide and hydrocarbons, as well as reduce nitrogen oxides ($NO_x$).

The present invention relates to a filter which can be used in exhaust systems suitable for use in conjunction with gasoline stoichiometric and gasoline direct injection (GDI) engines to capture particulates in addition to treating gaseous emissions such as hydrocarbons, nitrogen oxides, and carbon monoxides. In particular, it can relate to exhaust treatment systems comprising a three-way catalyst (TWC) and a particulate trap. That is, the particulate trap is provided with TWC catalyst compositions therein.

BRIEF DESCRIPTION OF THE DRAWINGS

The invention will now be described in relation to the following non-limiting figures, in which.

DETAILED DESCRIPTION OF THE INVENTION

Figure 1:
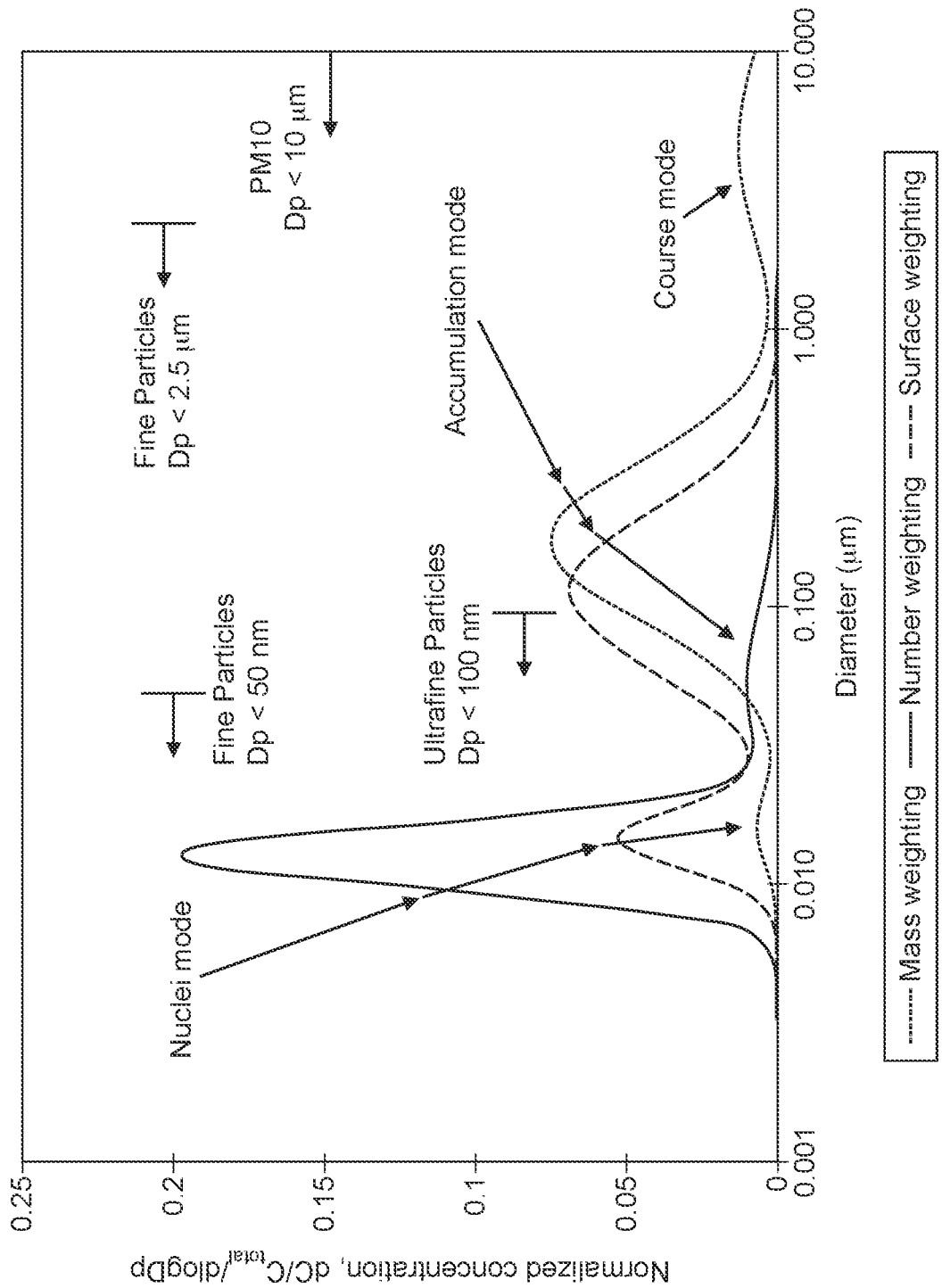
FIG. 1 is a graph showing the size distributions of PM in the exhaust gas of a diesel engine. For comparison, a gasoline size distribution is shown at FIG. 4 of SAE 1999-01-3530.
Figure 2A:
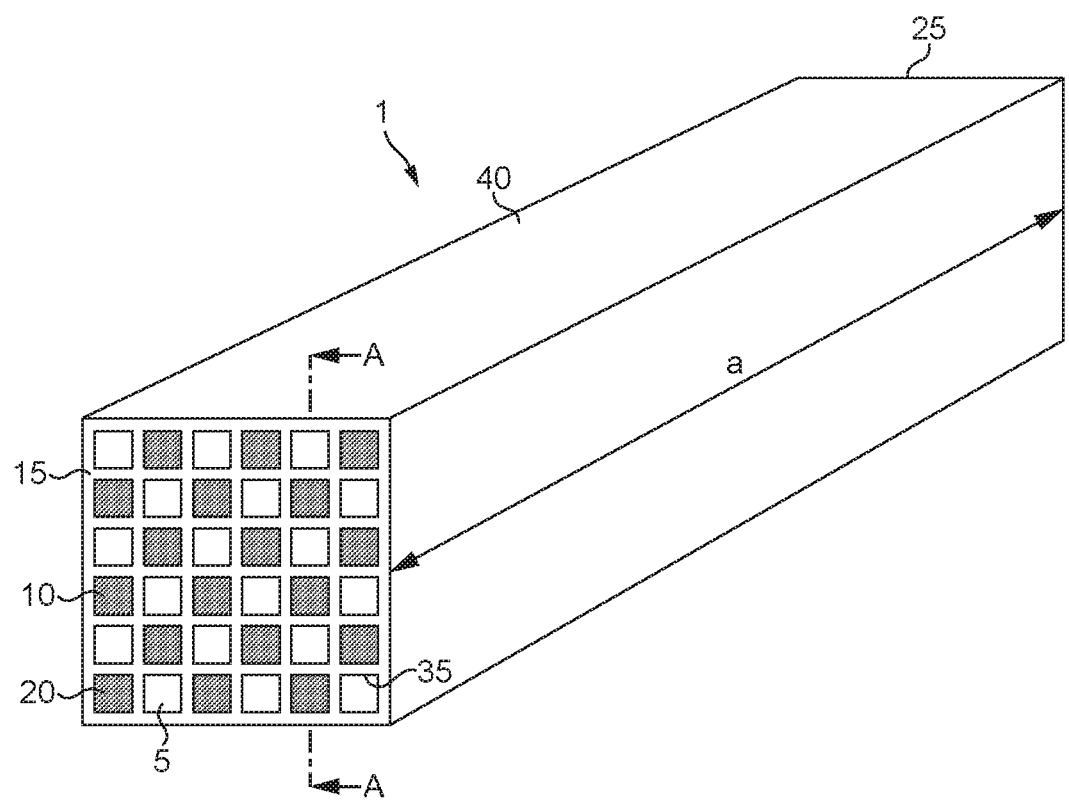
FIG. 2A is a perspective view that schematically shows a wall flow monolith filter 1 according to the present invention.
Figure 2B:
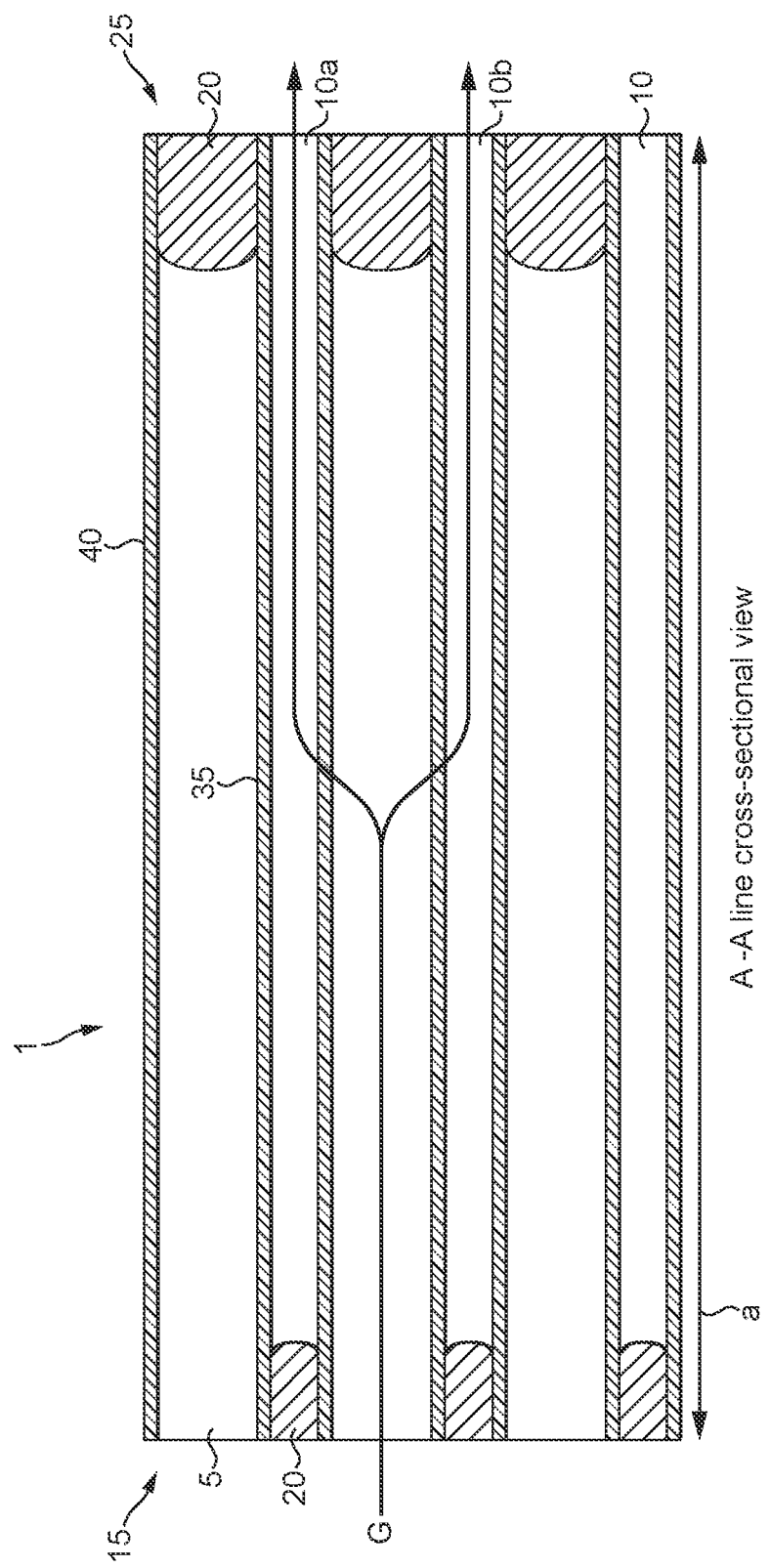
FIG. 2B is an A-A line cross-sectional view of the wall flow monolith filter 1 shown in FIG. 1A.

A wall flow monolith 1 according to the present invention is shown in FIG. 2A and FIG. 2B. It includes a large number of channels arranged in parallel with each other in the longitudinal direction (shown by a double-sided arrow "a" in FIG. 2A) of the monolith 1. The large number of channels includes a first subset of channels 5 and a second subset of channels 10.

The channels are depicted such that the second subset of channels 10 is narrower than the first subset of channels 5. This has been found to provide an increased ash/soot storage capacity in the filter. However, alternatively, the channels may be substantially the same size.

The first subset of channels 5 is open at an end portion on a first end face 15 of the wall flow monolith 1 and is sealed with a sealing material 20 at an end portion on a second end face 25.

On the other hand, the second subset of channels 10 is open at an end portion on the second end face 25 of the wall flow monolith 1 and is sealed with a sealing material 20 at an end portion on the first end face 15.

The wall flow monolith 1 is provided with a catalytic material within pores of the channels walls 35. This may be provided with a washcoat application method, as is known in the art and is discussed elsewhere in the specification.

Therefore, when the wall flow monolith is used in an exhaust system, exhaust gases G (in FIG. 2B "G" indicates exhaust gases and the arrow indicates a flowing direction of exhaust gases) introduced to the first subset of channels 5 will pass through the channel wall 35 interposed between the channel 5a and the channels 10a and 10b, and then flow out from the monolith 1. Accordingly, particulate matter in exhaust gases is captured by the channel wall 35.

The catalyst supported in the channel wall 35 of the monolith 1 functions as a catalyst for treating the exhaust gases from a gasoline engine including oxides of nitrogen (NOx), carbon monoxide (CO) unburned hydrocarbon fuel (HC) and particulate matter (PM).

Figure 3:
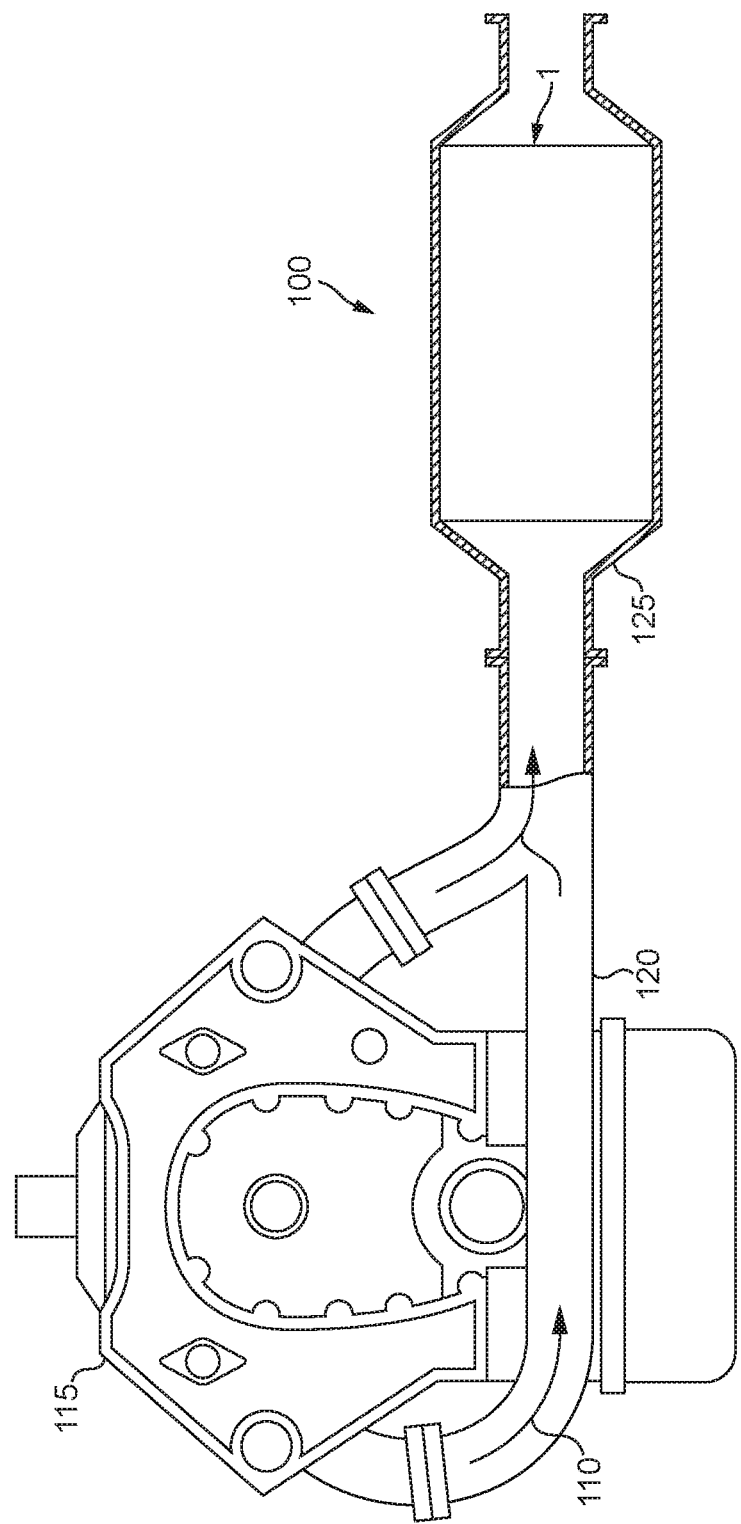
FIG. 3 shows a schematic diagram of an exhaust gas treatment system for a gasoline engine.

In the embodiment of the exhaust gas treatment system 100 shown in FIG. 3 the flow of exhaust gas 110 passes through the wall flow monolith 1. The exhaust gas 110 is passed from the engine 115 through ducting 120 to the exhaust system 125. The exhaust system can comprise additional components, such as a TWC composition applied to a honeycomb monolith (flow through) substrate and disposed either upstream or downstream of the catalytic wall flow monolith filter according to the invention. In the upstream or downstream TWC, unburned gaseous and non-volatile hydrocarbons (volatile organic fraction) and carbon monoxide are largely combusted to form carbon dioxide and water. In addition, nitrogen oxides are reduced to form nitrogen and water. Removal of substantial proportions of the VOF using the oxidation catalyst, in particular, helps to prevent too great a deposition of particulate matter (i.e., clogging) on the downstream filter according to the present invention.

As desired, after leaving the filter of the present invention, optionally the exhaust gas stream can next be conveyed via an appropriate exhaust pipe to a downstream NOx trap for adsorbing any remaining NOx emission contaminants in the exhaust gas stream. From the NOx trap through a further exhaust pipe, a SCR catalyst can be disposed to receive the outlet of the NOx trap to provide further emissions treatment of any ammonia generated by the NOx trap with a selective catalytic reduction catalyst for reducing oxides of nitrogen to form nitrogen and water using the ammonia as reductant. From the SCR catalyst, an exhaust pipe can lead to the tail pipe and out of the system.

Figure 4:
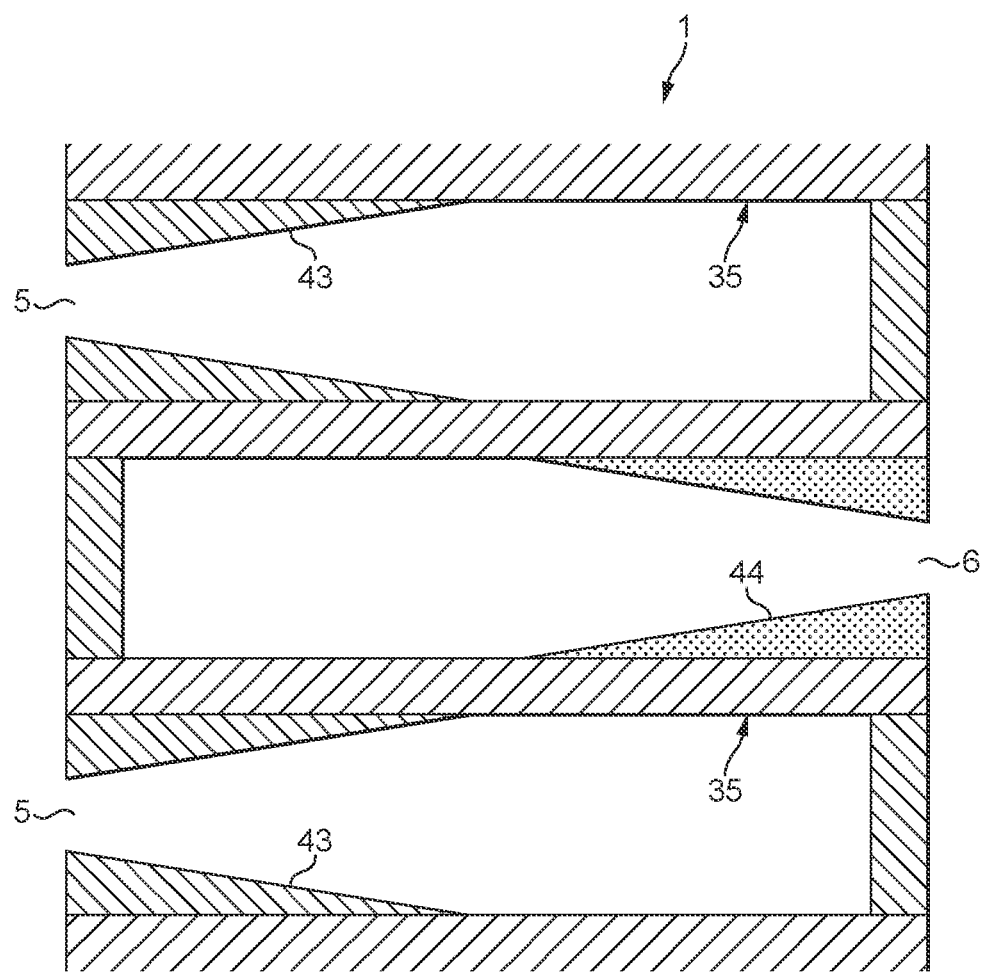
FIG. 4 shows a schematic diagram of varying layer thicknesses according to the invention.

FIG. 4 shows an embodiment of the invention wherein the coating provided on the channel walls 35 of the first plurality of channels 5 is formed of a first layer 43. The first layer 43 comprises a Pd/Rh mixture, a ceria-zirconia mixed oxide as an OSC and lanthana-stabilised alumina. The second layer 44 on the channel walls of the second plurality of channels 6 has the same composition as the first layer. In FIG. 4 the first layer 43 and the second layer 44 both vary continuously along the longitudinal direction (such as from 0 to 50 microns and vice versa).

Figure 5:
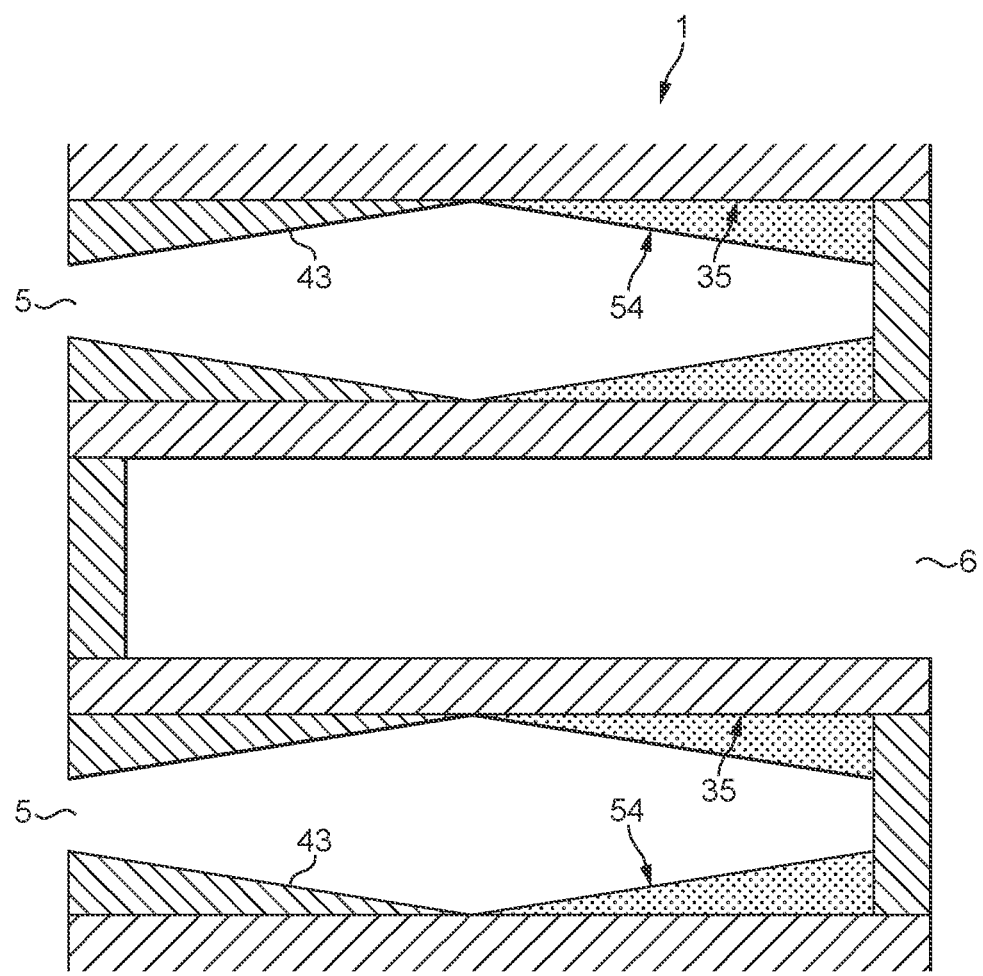
FIG. 5 shows a schematic diagram of another arrangement according to the invention having varying layer thicknesses.

FIG. 5 shows another embodiment of the invention wherein the coating provided on the channel walls 35 of the first plurality of channels 5 is formed of a first layer 43. The first layer 43 comprises a Pd/Rh mixture, a ceria-zirconia mixed oxide as an OSC and lanthana-stabilised alumina. The second layer, also on the channel walls of the first plurality of channels 5 has the same composition as the first layer 43. In FIG. 5 the first layer 43 and the second layer 54 both vary continuously along the longitudinal direction (such as from 0 to 50 microns and vice versa). Associated with the second layer 54 is an identical in-wall coating in the porous channel walls 35 corresponding to a wall portion having the same coating depth (longitudinal direction) as the second layer 54.

It should be noted that the wall flow monolith is described herein as a single component. Nonetheless, when forming an emission treatment system, the monolith used may be formed by adhering together a plurality of channels or by adhering together a plurality of smaller monoliths as described herein. Such techniques are well known in the art, as well as suitable casings and configurations of the emission treatment system.

The catalytic wall-flow monolith will now be described further in relation to the following non-limiting examples.

Example 1

A wall-flow filter was prepared based on a substrate having dimensions of 4.66 inches (diameter)×4.5 inches (length), a cell density/wall thickness 300/8 (cells per square inch/mils (thousandths of an inch channel wall thickness)), and a fully formulated three-way catalyst washcoat comprising Pd/Rh at 10:1 weight ratio at 22 g/ft$^3$ also comprising a ceria-zirconia based mixed oxide OSC and an alumina-based refractory oxide support at a loading of 2.4 g/in$^3$ (146.5 g/l) split 50:50 between a first plurality of channels and a second plurality of channels. The washcoat comprised a D50 of 4-6 microns and a D90 of <20 microns. The washcoat solids used was 32% which was thickened using a thickening agent as known to the skilled person to a target viscosity of 2200-2300 cP as measured at 20° C. on a Brookfield RV DVII+ Extra Pro viscometer using a SC4-27 spindle at 50 rpm spindle speed. The coating method used was according to the first method disclosed in UK patent publication no. 2524662, i.e. introducing a pre-determined amount of a liquid into a containment means at an upper end of the filter substrate; and applying a vacuum to a lower end of the filter substrate. The vacuum used is as described in the description above, but a combination at shorter duration and lower vacuum strength was used. The coated product was dried and calcined in the usual way.

The loading was applied in a wedge shaped on-wall profile having the thick end of the wedge at the channel openings at the respective end faces of the filter to 50% of the longitudinal length in each of the first and second pluralities of channels. Measurements were taken from SEM images at regular intervals denoted A-E (5 locations along the longitudinal direction at a mid-point between corners in the square-shaped cross section of the channels). The wedge was formed in accordance with FIG. 4. As a comparison the same wall-flow substrate filter was coated with the same three-way catalyst composition at the same total washcoat loading (mass of coated substrate less mass of uncoated substrate) to a 50:50 depth in both the first and second plurality of channels using the second method disclosed in UK patent publication no. 2524662, i.e. introducing a pre-determined amount of liquid into a containment means at an upper end of the filter substrate; and draining the liquid from the containment means into the filter substrate. The resulting product is referred to as "conventional" in the Table below.

| Catalyst | Section | Coating Method | Wall washcoat thickness (μm) |
|---|---|---|---|
| 2.4 g/in$^3$ | A | Conventional | 30.3 |
| | B | | 26.7 |
| | C | | 71.3 |
| | D | | 20.3 |
| | E | | 26.3 |
| 2.4 g/in$^3$ | A | Wedge | 82.3 |
| | B | | 49 |
| | C | | 9 |
| | D | | 22.5 |
| | E | | 63.3 |

The values at A and B represent the on-wall coating thickness in the first plurality of channels; D and E represent the on-wall coating thickness in the second plurality of channels; and the value at C is the sum of the on-wall coating thicknesses in both the first and second plurality of channels, so the arrangement is as shown schematically in FIG. 4.

It can be seen from the above Table, that the product according to the invention has a tapering or wedge shaped profile compared with the conventional filter.

Example 2

The conventional filter and the filter according to the invention as described in Example 1 were fitted in the exhaust system of a bench mounted laboratory V8 Land Rover gasoline turbo direct injection (GTDI) engine and aged using a proprietary test methodology involving 10 seconds of fuel cut (to simulate a driver lifting off the accelerator pedal, producing a "spike" of lean exhaust gas) followed by 180 seconds at lambda 1 (perturbated stoichiometric operation at 630° C. inlet temperature with 5% Lambda amplitude and 5 seconds switch time) repeated for 80 hours.

A lambda sweep test was then conducted on the aged sampled using a 2.0 litre GTDI laboratory bench-mounted engine certificated to the Euro 5 emission standard at 450° C. filter inlet temperature and 130 kg/h mass flow, 4% lambda amplitude and lambda set point of 0.991 to 1.01. A higher value indicates better conversion activity. The results are shown in the Table below. It can be seen that the filter according to the invention has a higher CO/NOx Cross-Over Point, i.e. is more active than the conventional filter.

| Coating | CO/NOx Cross-Over Point |
|---|---|
| Conventional | 71.50% |
| Wedge | 82.50% |

Example 3

A cold flow back pressure analysis of the coated and aged filters was done using a Superflow SF1020 apparatus, available commercially at http://www.superflow.com/Flowbenches/sf1020.php.

At 21° C. ambient temperature and at a flow rate of 600 m$^3$/hr, the results are as follows:

Conventional coated gasoline particulate filter (GPF)
=74.6 mbar (7.46 KPa); and Wedge coated GPF (according to the invention)
=76.1 mbar (7.61 KPa)

The results of Examples 2 and 3 show that the wedge shaped coating profile of the present invention has higher activity with no commensurate impact on backpressure.

Example 4

A wall-flow filter was prepared based on a substrate having dimensions of 4.66 inches (diameter)×6 inches (length), a cell density/wall thickness 300/8 (cells per square inch/mils (thousandths of an inch channel wall thickness)), and a fully formulated three-way catalyst washcoat comprising Pd/Rh at 70:30 weight ratio at 10 g/ft$^3$ also comprising a ceria-zirconia based mixed oxide OSC and an alumina-based refractory oxide support at a loading of 1.6 g/in$^3$ split 50:50 between a first plurality of channels and a second plurality of channels. The washcoat comprised a D50 of 2-4 microns and a D90 of <10 microns. The washcoat solids used was 19% which was thickened using a thickening agent as known to the skilled person to a target viscosity of 900-1000 cP as measured at 20° C. on a Brookfield RV DVII+ Extra Pro viscometer using a SC4-27 spindle at 50 rpm spindle speed. The coating method used was according to the first method disclosed in UK patent publication no. 2524662, i.e. introducing a pre-determined amount of a liquid into a containment means at an upper end of the filter substrate; and applying a vacuum to a lower end of the filter substrate. The vacuum used is as described in the description above, but a combination at shorter duration and lower vacuum strength was used. The coated product was dried and calcined in the usual way.

In contrast to Example 1, when the washcoat described in this Example was applied in a first step to this different substrate via the first plurality of channels using the first method disclosed in UK patent publication no. 2524662, the washcoat was "pulled through" the channel walls so that a wedge-shaped profile was observed by SEM only in that section of the substrate at the first face end of the substrate but in the second plurality of channels. The "thick end" of the wedge-shaped profile at the first face end was at the "plug end" of the second plurality of channels of the wall flow filter. It was determined also that TWC was located in-wall in the channel walls of the first approximately 50% of the longitudinal direction extending from the first face. The "thin end" of the observable on-wall coating wedge profile extended to about 50% along the second plurality of channels in the longitudinal direction from the first face towards the second face In a second step, the second plurality of channels of the substrate coated with the first "wedge" was then coated to a nominal 50% depth from the second face end using the first method disclosed in UK patent publication no. 2524662 and this resulted in a second on-wall wedge shaped coating profile to about 50% of the longitudinal direction in the second plurality of channels (with some coating also in-wall) with the thick end of the wedge at the open channel ends at the second face. The arrangement obtained is shown schematically in FIG. 5.

A reference sample to Example 4 was prepared for comparison, wherein the same substrate type, coating method, precious metal and washcoat loading were used to prepare Example 4 except in that the washcoat comprised a D50 of 4-6 microns and a D90 of <20 microns. The washcoat solids used was 26.65% and the washcoat was thickened using a thickening agent as known to the skilled person to a target viscosity of 900-1000 cP as measured at 20° C. on a Brookfield RV DVII+ Extra Pro viscometer using a SC4-27 spindle at 50 rpm spindle speed.

Both the sample of Example 4 and the Example 4 Reference sample (comparative) were analysed using SEM and measurements of images at three intervals denoted A-C (3 were taken at regular intervals along the longitudinal direction). The total of inlet and outlet channel on-wall washcoat thickness (correlating to a % of the total washcoat at that interval, assuming a uniform coating) was then used to infer the quantity of washcoat located in-wall. The results are shown in the Tables below. The inlet channels correspond to the first plurality of channels; and the outlet channels correspond to the second plurality of channels.

| Position | % washcoat on inlet channel wall | % washcoat in-wall | % washcoat on outlet channel wall |
|---|---|---|---|
| A (front) | 0 | 48.3 | 51.8 |
| B (middle) | 10.3 | 75.6 | 14.1 |
| C (rear) | 6.1 | 3.5 | 63.4 |

Reference

| Position | % washcoat on inlet channel wall | % washcoat in wall | % washcoat on outlet channel wall |
|---|---|---|---|
| A (front) | 17 | 33.6 | 48.9 |
| B (middle) | 11 | 54.9 | 34 |
| C (rear) | 9.1 | 47.7 | 43.2 |

The Reference sample (comparative) was found to have a more homogeneous distribution of washcoat along the (axial) length (i.e. longitudinal direction) of the part rather than the more pronounced wedge shape seen in Example 4.

Example 5

A cold flow back pressure analysis of the coated and aged filters Example 4 and its Reference (comparative) was done using the Superflow SF1020 apparatus described in Example 3 at 21° C. ambient temperature and at a flow rate of 700 m$^3$/hr, the results are as follows:

Example 4=92.82 mbar @ 700 m$^3$/hr (9.28 KPa);
and

Example 4 Reference (comparative)=116.56 mbar @ 700 m$^3$/hr (11.66 KPa).

From these data it can be seen that, by adjusting the D90 of the washcoat components, catalytic wall-flow filters according to the invention additionally provide the advantage of lower back pressure compared with conventional gasoline particulate filters.

Example 6 (Comparative)

Four wall-flow filters (4×5" and 600/4 cell density) were coated with TWCs having a platinum group metal (PGM) composition of 40 g/ft$^{-3}$/0:9:1 [Pt:Pd:Rh weight ratio]. Each TWC comprised a different weight ratio of $Al_2O_3$ to $CeZrO_4$.

The filters were fitted in the exhaust system of a bench mounted laboratory V8 Land Rover gasoline turbo direct injection (GTDI) engine and aged using a proprietary test methodology involving 10 seconds of fuel cut (to simulate a driver lifting off the accelerator pedal, producing a "spike" of lean exhaust gas) followed by 180 seconds at lambda 1 (perturbated stoichiometric operation at 630° C. inlet temperature with 5% Lambda amplitude and 5 seconds switch time) repeated for 80 hours.

A lambda sweep test was then conducted on the aged samples using a 2.0 litre GTDI (gasoline turbo direct injection) laboratory bench-mounted engine certificated to the Euro 5 emission standard at 450° C. filter inlet temperature and 130 kg/h mass flow, 4% lambda amplitude and lambda set point of 0.991 to 1.01. A higher value indicates better conversion activity. The results are shown in the Table below. It can be seen that the filter according to the invention has a higher CO/NOx Cross-Over Point, i.e. is more active than the conventional filter.

The results were as follows:

| | $Al_2O_3$:$CeZrO_4$ weight ratio | | | |
|---|---|---|---|---|
| | 1:1 | 1:2 | 1:3 | 1:4 |
| Vehicle NOx Emissions (g/km) | 0.049 | 0.052 | 0.053 | 0.057 |
| Relative NOx Emissions | 100.0% | 106.1% | 108.2% | 116.3% |
| NOx Conversion at lambda 1 (i.e. stoichiometric point) | 97.1% | 85.4% | 85.5% | 89.8% |

As can be seen from the table, increasing the $CeZrO_4$:$Al_2O_3$ ratio above 1:1 was found to be detrimental to the NOx conversion ability of the coated through-flow monolith.

Example 7

Four wall-flow filters (4.66×4.5" and 300/8 cell density) were coated with TWCs having PGM 60/0.57:3. Each TWC comprised a different weight ratio of $Al_2O_3$ to $CeZrO_4$. The coated filters were calcined and aged (Hydrothermal, 1100° C. in air with 10% $H_2O$ added, 5 h).

Using a 1.4 l GTDI test engine, the NOx emissions were measured based on a standard engine test. The results were as follows:

| | $Al_2O_3$:$CeZrO_4$ wt ratio | | | |
|---|---|---|---|---|
| | 1:1 | 1:2 | 1:3 | 2:1 |
| Vehicle NOx Emissions (g/km) | 0.058 | 0.046 | 0.04 | 0.054 |
| Relative NOx Emissions | 145.0% | 115.0% | 100.0% | 135.0% |

As can be seen from the table, as the $CeZrO_4$:$Al_2O_3$ wt ratio increased from 1:2 to 3:1, the relative NOx emissions decreased.

Example 8

Three wall-flow filters (4.66×4.5" and 300/8 cell density) were coated with TWCs having PGM 22/0:20:2. Each TWC comprised a different weight ratio of $Al_2O_3$ to $CeZrO_4$. The coated filters were calcined and aged as used in Example 7.

Using a 2.0 l GTDI Engine Bench test engine, the NOx emissions were measured based on a standard engine test. The results were as follows:

| | $Al_2O_3$:$CeZrO_4$ wt ratio | | |
|---|---|---|---|
| | 1:3 | 1:4 | 1:5 |
| NOx conversion at lambda 1 | 44.8 | 46.05 | 44.78 |

To coat the wall flow filters with the TWC composition, porous substrates are immersed vertically in a portion of the catalyst slurry such that the top of the substrate is located just above the surface of the slurry. In this manner slurry contacts the inlet face of each honeycomb wall, but is prevented from contacting the outlet face of each wall. The sample is left in the slurry for about 30 seconds. The filter is removed from the slurry, and excess slurry is removed from the wall flow filter first by allowing it to drain from the channels, then by blowing with compressed air (against the direction of slurry penetration), and then by pulling a vacuum from the direction of slurry penetration. By using this technique, the catalyst slurry permeates the walls of the filter, yet the pores are not occluded to the extent that undue back pressure will build up in the finished filter. As used herein, the term "permeate" when used to describe the dispersion of the catalyst slurry on the filter, means that the catalyst composition is dispersed throughout the wall of the filter.

The coated filters are dried typically at about 100° C. and calcined at a higher temperature (e.g., 300 to 450° C. and up to 550° C.). After calcining, the catalyst loading can be determined through calculation of the coated and uncoated weights of the filter. As will be apparent to those of skill in the art, the catalyst, loading can be modified by altering the solids content of the coating slurry. Alternatively, repeated immersions of the filter in the coating slurry can be conducted, followed by removal of the excess slurry as described above.

Example 9—Soot Combustion Tests

Two ceria-zirconia mixed oxides each doped with rare earth elements and having the composition shown in the Table below were tested for their soot combustion activity using a CATLAB-PCS combined microreactor and mass spectrometer laboratory apparatus (Hiden Analytical). A cordierite sample was tested as a control. The ceria-zirconia mixed oxides and the cordierite control were pre-fired at 500° C. for 2 hours.

Soot was collected from the engine of a European common rail light-duty diesel 2.2 litre capacity engine, which was certified to meet Euro IV emission standards. The exhaust system included a commercially available soot filter comprising an aluminium titanate wallflow filter. Soot was collected on the filter and the soot was removed from the filter by directing compressed air from a gun through the outlet channels of the filter.

To prepare the samples, 85 mg of each sample or cordierite was mixed with 15 mg of the soot using a pestle and mortar until the mix was a uniform colour, free of lumps and streaks. Periodically the cake was scraped from the wall of the mortar. No pre-treatment was carried out.

0.1 g of each sample/soot mixture (nominally containing 15 mg soot) was placed into a CATLAB microreactor tube. It was heated in 13% $O_2$/He with a temperature ramp rate of 10° C./min. The outlet gas was monitored by mass spectrometer.

Three samples of soot ground with fine cordierite (<250 μm) taken from the same batch of grinding, were run to assess the repeatability of the method. Very good repeatability was obtained for soot oxidation peak position and the shape of the evolved $CO_2$ profile. The reproducibility of the test methodology was investigated also by having two different scientists prepare the same mixed soot/ceria-zirconia mixed oxide material. Although differences in oxidation at higher temperatures were observed, possibly because of looser contact between the soot and the mixed oxide or unpromoted soot oxidation at 600° C., the main oxidation peak for both mixtures was sharp, well defined and at an identical temperature. Therefore, the method is reproducible and the main peak temperature is representative of the sample oxidation activity.

The results for soot oxidation are set out in the Table below, from which it can be seen that Sample B comprising 5 wt % $Pr_6O_{11}$ has a 2.5% lower soot oxidation temperature than Sample A, despite Sample A having a similar composition to Sample B. Inventors conclude that the inclusion of Sample A in an on-wall coating on inlet channels of a filter, thereby increasing contact between the soot and the coating will beneficially promote removal of soot at lower exhaust gas temperatures.

TABLE

| Sample | $CeO_2$ % | $ZrO_2$ % | $La_2O_3$ % | $Nd_2O_3$ % | $Pr_6O_{11}$ % | Soot Oxidation Temperature (° C.) |
|---|---|---|---|---|---|---|
| A | 45 | 48.5 | 1.5 | 5 | 0 | 352 |
| B | 45 | 45 | 0 | 5 | 5 | 343 |
| Control | n/a | n/a | n/a | n/a | n/a | ≈600 |

Although preferred embodiments of the invention have been described herein in detail, it will be understood by those skilled in the art that variations may be made thereto without departing from the scope of the invention or of the appended claims.

For the avoidance of doubt, the entire contents of all documents cited herein are incorporated herein by reference.

The invention claimed is:

1. A catalytic wall-flow monolith filter having three-way catalytic activity for use in an emission treatment system of a positive ignition internal combustion engine, wherein the wall-flow monolith filter comprises a porous filter substrate, the porous filter substrate having a first face and a second face defining a longitudinal direction therebetween and first and second pluralities of channels extending in the longitudinal direction, wherein the first plurality of channels is open at the first face and closed at the second face and the channels of the first plurality of channels are defined in part by channel wall surfaces, wherein the second plurality of channels is open at the second face and closed at the first face and the channels of the second plurality of channels are defined in part by channel wall surfaces and wherein channel walls between the channel wall surfaces of the first plurality of channels and the channel wall surfaces of the second plurality of channels are porous, wherein a first on-wall coating comprising catalytic material having a layer thickness is present on at least the channel wall surfaces of the first plurality of channels, wherein the catalytic material on channel wall surfaces of the first plurality of channels comprises one or more platinum group metal selected from the group consisting of (i) rhodium (Rh) only; (ii) palladium (Pd) only; (iii) platinum (Pt) and rhodium (Rh); (iv) palladium (Pd) and rhodium (Rh); and (v) platinum (Pt), palladium (Pd) and rhodium (Rh) and a refractory metal oxide support, wherein:

the layer thickness of the on-wall coating present on channel wall surfaces of the first plurality of channels varies continually along the longitudinal direction and the layer thickness of the on-wall coating is from 10 to 150 microns.

2. The catalytic wall-flow monolith filter according to claim 1, wherein a maximum layer thickness present on channel wall surfaces of the first plurality of channels is at the open end of the first plurality of channels.

3. The catalytic wall-flow monolith filter according to claim 1, wherein the catalytic material on the channel wall surfaces of the first plurality of channels comprises Pd:Rh at a ratio of 1:1 or higher.

4. The catalytic wall-flow monolith filter according to claim 1, wherein the catalytic material on the channel wall surfaces of the first plurality of channels comprises Pd as the only platinum group metal.

5. The catalytic wall-flow monolith filter according to claim 1, wherein the catalytic material on the channel wall surfaces of the first plurality of channels comprises Rh as the only platinum group metal.

6. The catalytic wall-flow monolith filter according to claim 1, wherein the catalytic material on channel wall surfaces of the first plurality of channels comprises an oxygen storage component (OSC).

7. The catalytic wall-flow monolith filter according to claim 6, wherein the OSC comprises ceria; a mixed oxide comprising ceria; a mixed oxide of cerium and zirconium; a mixed oxide of cerium, zirconium, and neodymium; a mixed oxide of praseodymium and zirconium; a mixed oxide of cerium, zirconium and praseodymium; or a mixed oxide of praseodymium, cerium, lanthanum, yttrium, zirconium and neodymium.

8. The catalytic wall-flow monolith filter according to claim 7, wherein the praseodymium is present at 2-10 wt % based on the total content of the mixed oxide.

9. The catalytic wall-flow monolith filter according to claim 1, wherein an on-wall coating comprising catalytic material having a layer thickness is further provided on the wall surfaces of the second plurality of channels, wherein an on-wall coating comprising catalytic material having a layer thickness is present on the channel wall surfaces of the second plurality of channels, wherein the catalytic material on channel wall surfaces of the second plurality of channels comprises one or more platinum group metal selected from the group consisting of (i) rhodium (Rh) only; (ii) palladium (Pd) only; (iii) platinum (Pt) and rhodium (Rh); (iv) palladium (Pd) and rhodium (Rh); and (v) platinum (Pt), palladium (Pd) and rhodium (Rh) and a refractory metal oxide support, and wherein:

the layer thickness of the on-wall coating present on channel wall surfaces of the second plurality of channels varies continually along the longitudinal direction and the layer thickness of the on-wall coating is from 10 to 150 microns.

10. The catalytic wall-flow monolith filter according to claim 9, wherein a maximum layer thickness present on channel wall surfaces of the second plurality of channels is at the open end of the second plurality of channels.

11. The catalytic wall-flow monolith filter according to claim 9, wherein the catalytic material on the channel wall surfaces of the second plurality of channels, the second on-wall coating of the first plurality of channels or the in-wall coating comprises Pd:Rh at a ratio of 1:1 or higher.

12. The catalytic wall-flow monolith filter according to claim 9, wherein the catalytic material on the channel wall surfaces of the second plurality of channels, in the second on-wall coating of the first plurality of channels or in the in-wall coating comprises Pd as the only platinum group metal and is different from the platinum group metal or combination of platinum group metals in the first plurality of channels or in the first on-wall coating of the first plurality of channels.

13. The catalytic wall-flow monolith filter according to claim 9, wherein the catalytic material on the channel wall surfaces of the second plurality of channels, in the second on-wall coating of the first plurality of channels comprises Rh as the only platinum group metal and is different from the platinum group metal or combination of platinum group metals in the first plurality of channels or in the first on-wall coating of the first plurality of channels.

14. The catalytic wall-flow monolith filter according to claim 9, wherein a composition of the catalytic material in the first plurality of channels is the same as that in the second plurality of channels, in the second on-wall coating in the first plurality of channels or in the in-wall coating.

15. The catalytic wall-flow monolith filter according to claim 9, wherein the catalytic material on channel wall surfaces of the second plurality of channels or the in-wall coating comprises an oxygen storage component (OSC).

16. The catalytic wall-flow monolith filter according to claim 15, wherein the OSC is ceria, a mixed oxide comprising ceria; a mixed oxide of cerium and zirconium; a mixed oxide of cerium, zirconium, and neodymium; a mixed oxide of praseodymium and zirconium; a mixed oxide of cerium, zirconium and praseodymium; or a mixed oxide of praseodymium, cerium, lanthanum, yttrium, zirconium and neodymium.

17. The catalytic wall-flow monolith filter according to claim 1, wherein the refractory metal oxide support comprises alumina or doped alumina.

18. The catalytic wall-flow monolith filter according to claim 1, wherein the layer thickness of the on-wall coating is from 10 to 100 microns.

19. The catalytic wall-flow monolith filter according to claim 1, wherein the layer thickness of the on-wall coating is from 20 to 50 microns.

20. An emission treatment system for treating a flow of a combustion exhaust gas from a positive ignition internal combustion engine, the system comprising the catalytic wall-flow monolith filter according to claim 1, wherein the first face is disposed upstream from the second face.

21. A method of manufacturing a catalytic wall-flow monolith filter according to claim 1, comprising:

providing a porous filter substrate having a first face and a second face defining a longitudinal direction therebetween and first and second pluralities of channels extending in the longitudinal direction, wherein the first plurality of channels is open at the first face and closed at the second face and the channels of the first plurality of channels are defined in part by channel wall surfaces, wherein the second plurality of channels is open at the second face and closed at the first face and the channels of the second plurality of channels are defined in part by channel wall surfaces and wherein channel walls between the channel wall surfaces of the first plurality of channels and the channel wall surfaces of the second plurality of channels are porous, contacting the first face of the porous filter substrate with a liquid slurry washcoat containing a catalytic material; drawing the liquid slurry washcoat into the first plurality of channels by application of a vacuum, wherein at least one of: a liquid catalytic washcoat solids content; a liquid catalytic washcoat rheology; a porosity of the porous filter substrate; a mean pore size of the porous filter substrate; a liquid catalytic washcoat volumetric mean particle size; and a liquid catalytic washcoat D90 (by volume), is pre-selected so that at least some of the catalytic material remains on channel wall surfaces of the first plurality of channels or both remains on channel wall surfaces of the first plurality of channels and permeates channel walls of the first plurality of channels; and drying and calcining the coated filter substrate, wherein the catalytic material in the liquid slurry washcoat comprises one or more platinum group metal selected from the group consisting of (i) rhodium (Rh) only; (ii) palladium (Pd) only; (iii) platinum (Pt) and rhodium (Rh); (iv) palladium (Pd) and rhodium (Rh); and (v) platinum (Pt), palladium (Pd) and rhodium (Rh) and a refractory metal oxide support, such that:

the layer thickness of the on-wall coating present on channel wall surfaces of the first plurality of channels varies continually along the longitudinal direction and the layer thickness of the on-wall coating is from 10 to 150 microns.

22. The method according to claim 21, wherein the first face is disposed uppermost, the liquid slurry washcoat is applied to the first face and the vacuum is applied from the second face.

23. A method of treating a combustion exhaust gas from a positive ignition internal combustion engine containing oxides of nitrogen ($NO_x$), carbon monoxide (CO) unburned hydrocarbon fuel (HC) and particulate matter (PM), which method comprising contacting the exhaust gas with the catalytic wall flow filter according to claim 1.

\* \* \* \* \*